US010908838B2

(12) United States Patent
Zhou et al.

(10) Patent No.: US 10,908,838 B2
(45) Date of Patent: Feb. 2, 2021

(54) COLUMN REPLACEMENT WITH NON-DEDICATED REPLACEMENT COLUMNS

(71) Applicant: SanDisk Technologies LLC, Plano, TX (US)

(72) Inventors: Dike Zhou, San Jose, CA (US); Yen-Lung Li, San Jose, CA (US)

(73) Assignee: SanDisk Technologies LLC, Addison, TX (US)

( * ) Notice: Subject to any disclaimer, the term of this patent is extended or adjusted under 35 U.S.C. 154(b) by 26 days.

(21) Appl. No.: 16/354,004

(22) Filed: Mar. 14, 2019

(65) Prior Publication Data

US 2020/0097209 A1 Mar. 26, 2020

Related U.S. Application Data

(60) Provisional application No. 62/736,109, filed on Sep. 25, 2018.

(51) Int. Cl.
*G06F 3/06* (2006.01)

(52) U.S. Cl.
CPC ............ *G06F 3/0655* (2013.01); *G06F 3/061* (2013.01); *G06F 3/0679* (2013.01)

(58) Field of Classification Search
CPC .......................................................... G06F 3/06
USPC ........................................................ 711/154
See application file for complete search history.

(56) References Cited

U.S. PATENT DOCUMENTS

| 7,170,802 | B2 | 1/2007 | Cernea et al. | |
|---|---|---|---|---|
| 7,433,980 | B1 * | 10/2008 | Fischaber | G11C 7/1006 365/189.02 |
| 7,643,362 | B2 | 1/2010 | Nagashima | |
| 8,190,950 | B2 | 5/2012 | Chen et al. | |
| 8,681,548 | B2 | 3/2014 | Liu et al. | |
| 8,711,625 | B2 | 4/2014 | Li et al. | |
| 8,897,080 | B2 | 11/2014 | Tsai | |
| 9,490,035 | B2 | 11/2016 | Tsai et al. | |
| 9,627,094 | B2 | 4/2017 | Yano | |
| 9,748,001 | B2 | 8/2017 | Li et al. | |
| 9,786,388 | B1 * | 10/2017 | Nassie | G06F 11/1072 |
| 10,120,816 | B2 | 11/2018 | Tsai et al. | |
| 2002/0122343 | A1 * | 9/2002 | Koshikawa | G11C 29/72 365/200 |
| 2006/0171233 | A1 * | 8/2006 | Fekih-Romdhane | G11C 7/1051 365/230.03 |

(Continued)

*Primary Examiner* — Christopher B Shin
(74) *Attorney, Agent, or Firm* — Vierra Magen Marcus LLP

(57) ABSTRACT

Apparatuses, systems, and methods are presented for column replacement. An input register, which includes a set of input divisions, may receive write data for a memory array. An output register, which includes a set of normal output divisions and a set of replacement output divisions, may output write data to an array. A column replacement circuit may selectively couple input divisions to output divisions. A column replacement circuit may couple normal output divisions for functional columns of an array to corresponding input divisions. A column replacement circuit may couple replacement output divisions for functional columns of an array to input divisions selected by the column replacement circuit, which may be corresponding input divisions or other input divisions.

18 Claims, 12 Drawing Sheets

(56) References Cited

U.S. PATENT DOCUMENTS

| | | | |
|---|---|---|---|
| 2007/0141731 A1* | 6/2007 | Hemink | G11C 29/50004 |
| | | | 438/14 |
| 2011/0069549 A1 | 3/2011 | Tokiwa | |
| 2011/0205824 A1* | 8/2011 | Kajigaya | G11C 7/1006 |
| | | | 365/219 |
| 2014/0157087 A1* | 6/2014 | Yurzola | G11C 29/52 |
| | | | 714/773 |
| 2016/0124664 A1 | 5/2016 | Sabde et al. | |
| 2016/0179620 A1* | 6/2016 | Bazarsky | H03M 13/3707 |
| | | | 714/766 |
| 2017/0090788 A1* | 3/2017 | Shlick | G11C 29/808 |
| 2017/0185499 A1* | 6/2017 | Lee | G11C 29/785 |
| 2017/0199668 A1 | 7/2017 | Ouyang et al. | |
| 2018/0024948 A1 | 1/2018 | Tsai et al. | |
| 2019/0087291 A1* | 3/2019 | Schicht | G06F 3/0659 |

\* cited by examiner

COLUMN REPLACEMENT WITH NON-DEDICATED REPLACEMENT COLUMNS

CROSS-REFERENCES TO RELATED APPLICATIONS

This application claims the benefit of U.S. Provisional Patent Application No. 62/736,109 entitled "COLUMN REPLACEMENT" and filed on Sep. 25, 2018, for Dike Zhou et al., which is incorporated herein by reference.

TECHNICAL FIELD

The present disclosure, in various embodiments, relates to memory devices and more particularly relates to column replacement for a memory array.

BACKGROUND

In certain types of memory devices, multiple bits of data may be written together to columns of a memory array, or read together from columns of the memory array. For example, a row of memory cells may be selected via a word line, and bits of data may be read to or written from cells in that row, via parallel bit lines that are coupled to columns of cells. Certain defects that occur during manufacturing of memory chips or dies, or that arise over time as memory is used, may affect the reliability of columns of cells. For example, a short between adjacent bit lines may result in bits not being correctly written to cells in the affected columns, or in bits not being correctly read from cells in the affected columns.

Data that would be written to a cell in a bad or non-functional column may be redirected to another location, and the redirection may be reversed when reading the data. However, redirecting or rearranging data may add latency to a read or write operation, and may involve complicated routing, or additional die space for temporarily storing data.

SUMMARY

Apparatuses are presented for column replacement. In one embodiment, an input register is configured to receive write data for a memory array. In a further embodiment, an input register includes a set of input divisions. In one embodiment, an output register is configured to output write data to an array. In a further embodiment, an output register includes a set of normal output divisions and a set of replacement output divisions. A column replacement circuit, in one embodiment, is configured to selectively couple input divisions to output divisions. In certain embodiments, a column replacement circuit couples normal output divisions for functional columns of an array to corresponding input divisions. In further embodiments, a column replacement circuit couples replacement output divisions for functional columns of an array to input divisions selected by the column replacement circuit, which may be corresponding input divisions or other input divisions.

Systems are presented for column replacement. A system, in one embodiment, includes a memory array. In certain embodiments, an array-side register coupled to a memory array receives read data from the memory array. In one embodiment, an input/output (I/O)-side register outputs read data. In certain embodiments, an array-side register and an I/O-side register both include corresponding sets of normal divisions and replacement divisions. A column replacement circuit, in one embodiment, transfers read data from an array-side register to an I/O-side register, and rearranges the read data based on column information for an array. In certain embodiments, a column replacement circuit rearranges data by coupling normal divisions of an array-side register for functional columns of an array to corresponding divisions of an I/O-side register. In further embodiments, a column replacement circuit rearranges data by coupling replacement divisions of an array-side register for functional columns of an array to divisions of an I/O-side register selected by the column replacement circuit, which may be corresponding divisions of the I/O-side register or other divisions of the I/O-side register.

Methods are presented for column replacement. A method, in one embodiment, includes fetching a variable amount of data from an input/output buffer, based on bad column information for a memory array, for writing the data to the array. In a further embodiment, a method includes rearranging data by selectively coupling the data to divisions of a register corresponding to good columns of the array. In one embodiment, a method includes outputting data from a register to a memory array.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1:
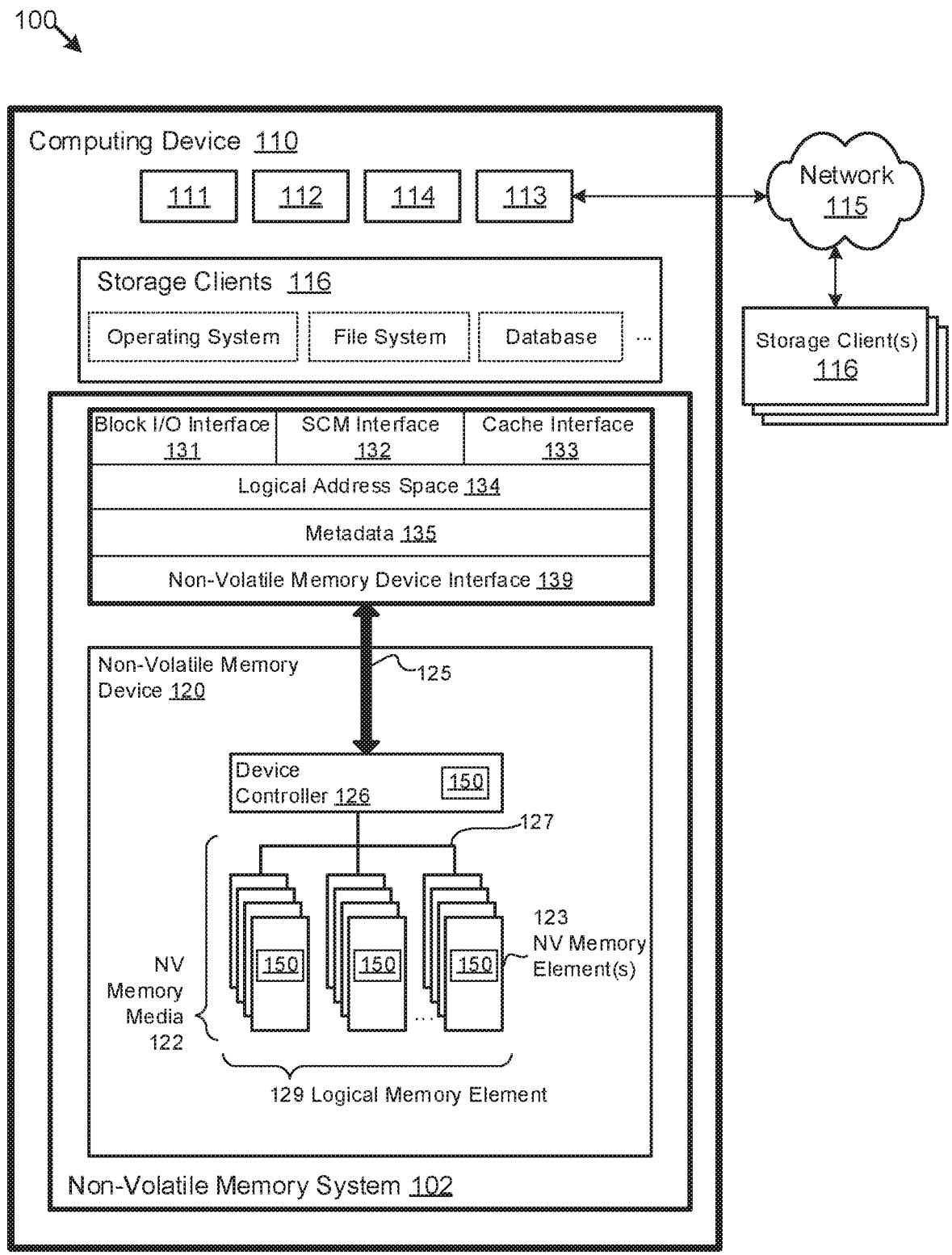
FIG. 1 is a schematic block diagram illustrating one embodiment of a system comprising non-volatile memory elements.

Aspects of the present disclosure may be embodied as an apparatus, system, method, or computer program product.

Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, or circuitry, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include an integrated circuit, a portion of an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 comprising one or more column replacement components 150 for a non-volatile memory device 120. Column replacement components 150 may be part of and/or in communication with one or more non-volatile memory elements 123, a device controller 126 external to the non-volatile memory elements 123, a device driver, or the like. Column replacement components 150 may be part of a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or device controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more expansion cards and/or daughter cards, a solid-state-drive (SSD) or other hard drive device, and/or may have another memory and/or storage form factor.

The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a Serial Advanced Technology Attachment (SATA) bus, a Parallel Advanced Technology Attachment (PATA) bus, a Small Computer System Interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a Storage Area Network (SAN), a Local Area Network (LAN), a Wide Area Network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein. Alternatively, or in addition, the column replacement component 150 may be embodied as one or more computer readable instructions stored on the non-transitory storage media 114.

The non-volatile memory system 102, in the depicted embodiment, includes one or more column replacement components 150. A column replacement component 150, in one embodiment, may rearrange data for read operations and write operations of a memory array, based on column information for the array. Rearranging data based on column information may facilitate writing data to, and reading the data from, good or functional columns, and may avoid errors that might otherwise occur due to bad or non-functional columns.

In certain embodiments, the column replacement component 150 may read or write bits of data in parallel to or from a group of selected columns, which may be referred to as a "window" or "access window" of columns that are selected for transferring data to or from the array, or which may be referred to specifically as a "write window" of columns selected for transferring data to the array, or a "read window" of columns selected for transferring data from the array. In further embodiments, the column replacement component 150 may use different columns in the window or group of columns as "normal" columns and as "replacement" columns: if a column in the window is bad or non-functional, the column replacement component 150 may rearrange the data, so that data that would normally be written to or read from the bad or non-functional column is routed to be written to or read from a replacement column. For example, the column replacement component 150 may write data for a non-functional normal column to a functional replacement column (or may write data for a non-functional replacement column to a functional replacement column.) Using some columns as normal columns, which are not targets for redirected write data, may simplify data routing compared to column shifting or skipping methods, in which every column after a bad or non-functional column is a target for shifted, offset, or redirected write data.

Additionally, in various embodiments, the column replacement component 150 may use replacement columns as non-dedicated replacements: if all the columns in the current window or group of columns are good or functional, the column replacement component 150 may write data to (or read data from) the normal columns and the replacement columns, effectively using the replacement columns as additional normal columns rather than as targets for redirected data. Similarly, if there are more replacement columns in the window than there are bad or non-functional columns, the column replacement component 150 may use some of the replacement columns as replacements, as described above, and may also write data to (or read data from) the remaining replacement columns. Using non-dedicated replacement columns, in certain embodiments, may efficiently use die space that would be unused if dedicated replacement columns were only used to compensate for bad or non-functional columns. Additionally, in some embodiments, using non-dedicated replacement columns may use less die area for metal wire routing than a design where dedicated replacement columns have their own data bus.

A column replacement component 150, in certain embodiments, may include a pair of data registers, where the registers are divided into "normal" and "replacement" divisions corresponding to normal and replacement columns. A column replacement component 150 may couple divisions of the two registers together so that a second register receives data from a first register. In certain embodiments, a column replacement component 150 may rearrange data by selectively coupling the register divisions, to determine which divisions in the second register receive data from which divisions in the first register.

For example, if there are no bad columns in a current write window, the column replacement component 150 may couple the first division in the first register to the first division in the second register, couple the second division in the first register to the second division in the second register, and so on, coupling corresponding divisions together so that the data is in the same order in both registers. Conversely, if there is a bad column in the write window, the column replacement component 150 may couple the division that corresponds to the bad column, in the first register, to a replacement division for a good column, in the second register, so that the data in the second register is in a different order than the data in the first register.

In certain embodiments, a column replacement component 150 may similarly rearrange data by selectively coupling divisions of two registers to compensate for bad columns when reading data from a memory array. Couplings to compensate for bad columns in a read window may be the same as the couplings to compensate for bad columns in a write window, but with the direction of data flow reversed so that the reordering of data during a write operation is reversed to return read data in the order in which it was originally provided as write data.

Additionally, in certain embodiments, a column replacement component 150 that uses columns as normal columns and as non-dedicated replacement columns may transfer a variable amount of data to or from an input/output (I/O) buffer. For example, if the write window includes N normal columns and R non-dedicated replacement columns, than the column replacement component may transfer data to or from an I/O buffer for at least N columns (if all the replacement columns are used to compensate for bad columns), up to N+R columns (if there are no bad columns in the write window). In certain embodiments, a column replacement component 150 may include or communicate with an I/O buffer and/or other circuitry for transferring a variable amount of data. Column replacement components 150 are described in greater detail below with regard to FIGS. 2-8.

In one embodiment, a column replacement component 150 may include logic hardware of one or more non-volatile memory devices 120, such as a device controller 126, a non-volatile memory element 123, other programmable logic, firmware for a non-volatile memory element 123, microcode for execution by a non-volatile memory element 123, or the like. In another embodiment, a column replacement component 150 may include executable software code, stored on a computer readable storage medium for execution by logic hardware of a computing device 110, a device controller 126, and/or a non-volatile memory element 123. In a further embodiment, a column replacement component 150 may include a combination of both executable software code and logic hardware.

In one embodiment, the non-volatile memory device 120 is configured to receive storage requests from a device driver or other executable application via buses 125, 127, a device controller 126, or the like. The non-volatile memory device 120 may be further configured to transfer data to/from a device driver and/or storage clients 116 via the bus 125. Accordingly, the non-volatile memory device 120, in some embodiments, may comprise and/or be in communication with one or more direct memory access (DMA) modules, remote DMA modules, bus controllers, bridges, buffers, and so on to facilitate the transfer of storage requests and associated data. In another embodiment, the non-volatile memory device 120 may receive storage requests as an API call from a storage client 116, as an IO-CTL command, or the like.

According to various embodiments, a device controller 126 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the device controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), a cache line address, a memory address, a cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical-to-physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective device controllers 126 and non-volatile memory media 122. A device driver may provide access to the one or more non-volatile memory devices 120 via a traditional block I/O interface 131. Additionally, a device driver may provide access to enhanced functionality through the storage class memory (SCM) interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more device controllers 126.

A device driver may present a logical address space 134 to the storage clients 116 through one or more interfaces. As discussed above, the logical address space 134 may comprise a plurality of logical addresses, each corresponding to respective media locations the on one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, a fabric, Infiniband, Ethernet, Omnipath, GenZ, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the device controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The device controller 126 is part of and/or in communication with one or more non-volatile memory devices 120. Although FIG. 1 depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: Resistive RAM (ReRAM), Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM).

While legacy technologies such as NAND flash may be block and/or page addressable, or may use block-level erase operations, storage class memory, in one embodiment, may be byte addressable, and may provide byte-level read and write operations (e.g., write operations may include byte-level program and byte-level erase operations, or may include byte-level write operations capable of overwriting data in place without a previous erase operation). In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like. Similarly, a non-volatile memory element 123, in various embodiments, may comprise a non-volatile recording element, a non-volatile memory element, a non-volatile storage element, or the like.

The non-volatile memory media 122 may comprise one or more non-volatile memory elements 123, which may include, but are not limited to: chips, packages, planes, die, or the like. A device controller 126, external to the one or more non-volatile memory elements 123, may be configured to manage data operations on the non-volatile memory media 122, and may comprise one or more processors, programmable processors (e.g., FPGAs), ASICs, microcontrollers, or the like. In some embodiments, the device controller 126 is configured to store data on and/or read data from the non-volatile memory media 122, to transfer data to/from the non-volatile memory device 120, and so on.

The device controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the device controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The device controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102.

A device driver may further comprise a non-volatile memory device interface 139 that is configured to transfer data, commands, and/or queries to the device controller 126 over a bus 125, as described above.

Figure 2:
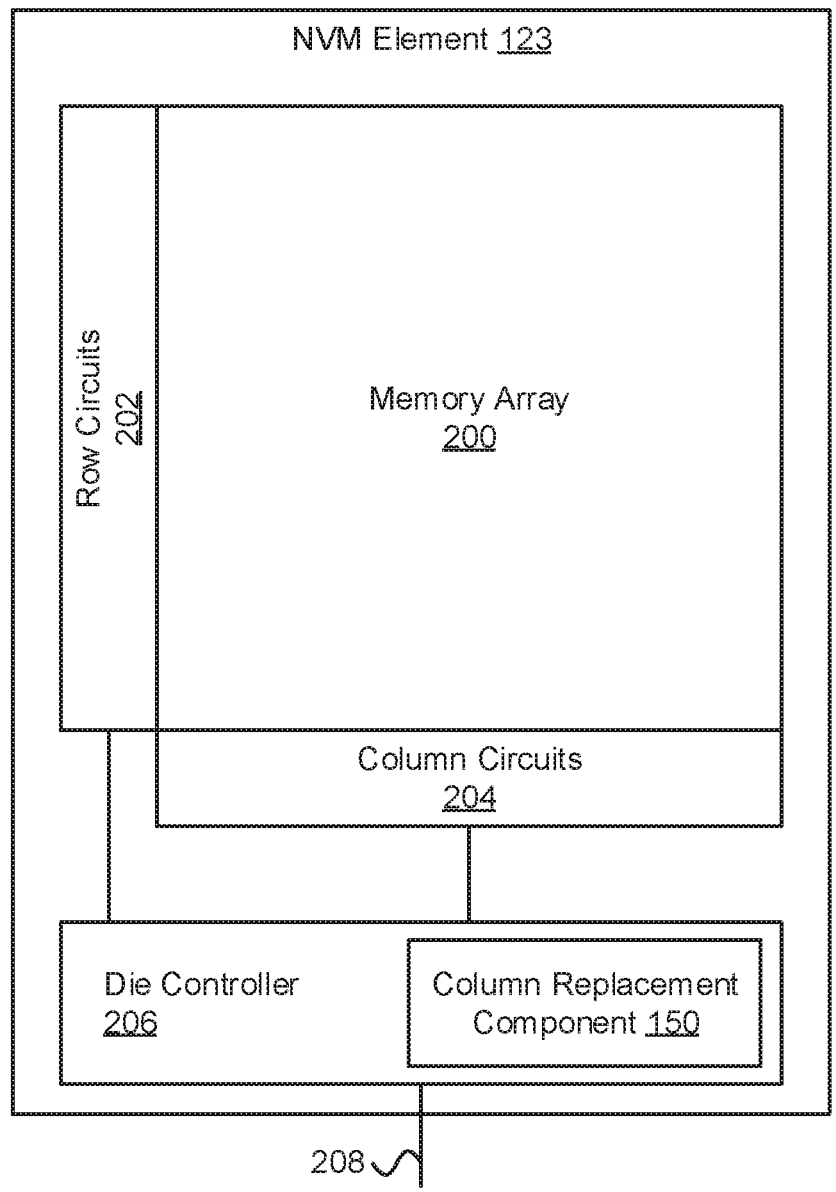
FIG. 2 is a schematic block diagram illustrating one embodiment of a non-volatile memory element.

FIG. 2 depicts one embodiment of a non-volatile memory element 123. The non-volatile memory element 123 may be substantially similar to the non-volatile memory element 123 described with reference to FIG. 1. The non-volatile memory element 123, in the depicted embodiment, includes a memory array 200, row circuits 202, column circuits 204, and a die controller 206.

In various embodiments, a non-volatile memory element 123 may be an integrated circuit (e.g., a chip or die) that includes both a core memory array 200 for data storage, and peripheral components (e.g., row circuits 202, column circuits 204, and/or a die controller 206) for communicating with the array 200. In certain embodiments, one or more non-volatile memory elements 123 may be included in a memory module, a storage device, or the like. Although a non-volatile memory element 123 including an array 200 of non-volatile memory cells is depicted, the disclosure is not limited in this regard. In another embodiment, a system may include one or more memory die, which may be integrated circuits including one or more volatile and/or non-volatile memory arrays 200, which in turn may include volatile and/or non-volatile memory cells. A column replacement component 150 may rearrange data based on column information for volatile and/or non-volatile memory arrays 200.

In the depicted embodiment, the memory array 200 includes a plurality of non-volatile memory cells for storing data. In one embodiment, the array 200 may be a two-dimensional array. In another embodiment, the array 200 may be a three-dimensional array that includes multiple planes and/or layers of non-volatile memory cells. Memory cells, in various embodiments, may be the individual physical units of data storage for a memory array 200, such as floating gate transistors for Flash memory, magnetic tunnel junctions for MRAM memory, resistors with changeable resistance for ReRAM, capacitors for DRAM, or the like. In various embodiments, the array 200 may be addressable by rows via row circuits 202, and by columns via column circuits 204.

The die controller 206, in the depicted embodiment, is disposed on the same non-volatile memory element 123 or memory die as the array 200. By contrast, a device controller 126 as described above with reference to FIG. 1, may be external to a non-volatile memory element 123 or memory die, and may communicate with a set of one or more non-volatile memory elements 123 or memory dies to read and write data.

The die controller 206, in certain embodiments, cooperates with the row circuits 202 and the column circuits 204 to perform memory operations on the array 200. In various embodiments, the die controller 206 may include components such as a power control circuit that controls the power and voltages supplied to the row circuits 202 and column circuits 204 during memory operations, an address decoder that translates a received address to a hardware address used by the row circuits 202 and column circuits 204, a state machine that implements and controls the memory operations, and the like. The die controller 206 may communicate with a computing device 110, a processor 115, a bus controller, a device controller 126, a memory module controller, or the like, via bus 208, to receive command and address information, transfer data, or the like.

In certain embodiments, word lines couple row circuits 202 to rows of cells, and bit lines couple column circuits 204 to columns of cells. Thus, in one embodiment, to write data to a row of the array 200, the die controller 206 may use row circuits 202 to apply write pulses or a write voltage to a word line, and may use column circuits 204 to apply program or inhibit voltages for bit lines for cells in the row, corresponding to writing a 0 or a 1 to the cells. In a further embodiment, to read data from a row of the array 200, the die controller 206 may use row circuits 202 to apply read pulses or a read voltage to a word line and may use column circuits 204 to sense voltages or currents at bit lines for cells in the row, to determine what data is stored. Various other or further ways of writing or reading data to or from cells in rows, columns, planes, and/or other units of an array 200 will be clear. The term "word line" may be used herein to refer to a conductor that couples cells to row circuits 202, or to the cells that are coupled to the conductor. Similarly, the term "bit line" may be used herein to refer to a conductor that couples cells to column circuits 204, or to the cells that are coupled to the conductor.

In the depicted embodiment, the die controller 206 includes a column replacement component 150, which may be substantially similar to the column replacement components 150 described with reference to FIG. 1. In certain embodiments, the die controller 206 may write data to the array 200, or read data from the array 200, and the column replacement component 150 may rearrange data (e.g., by selective coupling between divisions of two registers) to compensate for bad or non-functional columns.

In various embodiments, detecting and correcting skip inconsistencies may be done by a column replacement component 150 of a die controller 206 for a volatile or non-volatile memory element 123, and/or may be done by a column replacement component 150 of a device driver or device controller 126 for a non-volatile memory device 120 (e.g., treating individual memory elements 123 or dies as columns). In another embodiment, a column replacement component 150 may include portions of a device driver, a device controller 126, one or more die controllers 206, and/or the like.

Figure 3A:
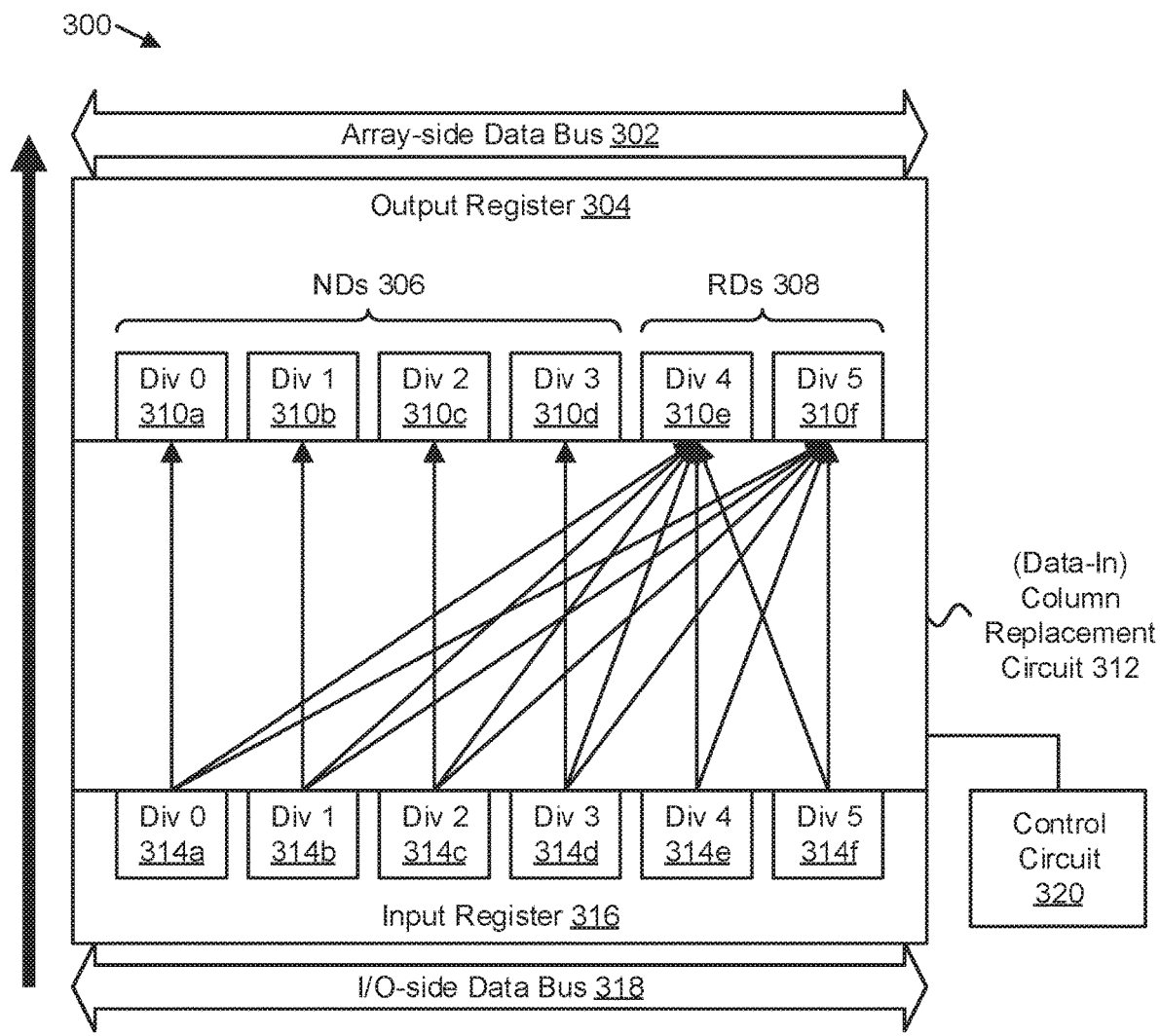
FIG. 3A is a schematic block diagram illustrating one embodiment of a write apparatus for a column replacement component.

FIG. 3A depicts one embodiment of a write apparatus 300 for a column replacement component 150. In various embodiments, a column replacement component 150, which may be substantially as described above with reference to FIGS. 1-2, may include a write apparatus 300. In the depicted embodiment, the write apparatus 300 includes an output register 304, a column replacement circuit 312, and an input register 316, which are described below.

In various embodiments, the input register 316 is configured to receive write data for a memory array 200, and the output register 304 is configured to output the write data to the array 200. The flow of write data from the input register 316 to the output register 304, to the array 200 is represented by an upward pointing arrow to the left of FIG. 3A.

In various embodiments, a memory element 123 may include an input/output (I/O) buffer that temporarily stores write data received from an external component such as a device controller 126, and/or read data to be sent to an external component such as a device controller 126. For example, an input/output buffer may include a bidirectional first-in-first-out (FIFO) buffer, a pair of FIFO buffers (e.g., one for read data and one for write data), or the like. A die controller 206 may use a data bus or buses internal to a memory die to transfer data between the I/O buffer and the write apparatus 300, or to transfer data between the write apparatus 300 and the array 200. Similarly, for read operations as described below with reference to FIG. 3B, a die controller 206 may use an internal data bus or buses to transfer data between the array 200 and a read apparatus 350, or to transfer data between the read apparatus 350 and an I/O buffer.

In FIG. 3A, an internal bus that the input register 316 uses to receive write data (e.g., from an I/O buffer) is designated as an I/O-side data bus 318. Similarly, an internal bus that the output register 304 uses to output data to the array 200 is designated as an array-side data bus 302. In certain embodiments, a data bus such as the array-side data bus 302 or the I/O-side data bus 318 may be a parallel bus that uses multiple conductors to convey multiple bits of data together in parallel. Bits of data may be referred to herein as being conveyed, transferred, coupled (or the like) in parallel, if the bits are transferred substantially simultaneously or at overlapping times over different conductors, rather than sequentially over a single conductor. A width of a data bus may refer to a number of bits that the bus conveys in parallel. For example, a 64-bit wide data bus may transfer a group of 64 bits in parallel (and may transfer more than 64 bits in a sequence of 64-bit groups).

A register such as the output register 304 or the input register 316, in various embodiments, may be a circuit or set of circuits that stores data, and may include a set of components that store data, such as flip-flops, latches, volatile memory cells, non-volatile memory cells, or the like. For example, in one embodiment, a register may be a set of flip-flops. In another embodiment, a register may be a region of SRAM cache memory, DRAM memory, or another type of memory, that is used for staging data being read to or written from the array 200. A width for a register, like a width of a data bus, may refer to a number of bits concurrently stored by the register. For example, a 64-bit wide register may store 64 bits of data in 64 flip-flops, latches, or the like. In the depicted embodiment, the output register 304 may output data to columns of the array 200.

A column, in one embodiment, may be a bit line, or a group of cells coupled together by a bit line. In another embodiment, a column may be a set of bit lines, or the cells coupled to that set of bit lines. Multiple bits of data may be written together to columns of a memory array 200, or read together from columns of the memory array 200. For example, a row of memory cells may be selected via a word line, and bits of data may be read to or written from cells in that row, via parallel bit lines that are coupled to columns of cells.

In certain embodiments, a column may be a set of one or more bit lines (or the corresponding cells), which the column replacement component 150 treats as a unit when reading or writing data. For example, if a column is a set of sixteen bit lines, and if one of the bit lines is defective or non-functional, the column replacement component 150 may reroute sixteen bits of data to another column, regardless of whether any bit lines in the defective column are individually good or functional. The term "column" is not intended to be limiting as to the physical orientation of the cells. For example, in a 2-dimensional memory array 200, cells in a column may be aligned in a horizontal direction (e.g., along a "y" axis), but in a 3-dimensional memory array 200 cells in a column may be aligned in a vertical direction (e.g., along a "z" axis). Rather, the term "column" indicates that data may be written in parallel (e.g., via different bit lines) to cells in different columns (e.g., across cells in a row), and that cells in one column are treated as a group for column replacement/redundancy purposes.

For example, in one embodiment, sixteen bit lines may be managed as a group or column, so that replacing a column involves rerouting data for sixteen bit lines to or from another column of sixteen bit lines). In another embodiment, a column may include more or fewer than sixteen bit lines. Additionally, the term "column" may be used herein to refer to the cells of a shared bit line or set of bit lines, or to those cells where they intersect a row, a word line, or another group of cells that can be written to in parallel. Thus, writing to or reading from a column may refer to writing to or reading from one or more cells in the column. For example, when writing data to a row of an array 200, the row may be selected and data may be written to cells in the row via the bit lines for columns such as column 0, column 1, column 2, and so on, which may be referred to as writing data to those columns, even if no data is being written to cells of those columns that do not intersect the row. Thus, in the depicted embodiment, the a sixteen-bit "column" may refer to cells for a set of sixteen bit lines or may refer to sixteen cells where those sixteen bit lines intersect a row.

In various embodiments, arrays 200 may include various numbers of columns. For example, an array 200 may include hundreds of columns, thousands of columns or more. For example, some memory devices may store a page of 512 B, 2048 KiB, 4096 KiB or the like, using an equivalent number of eight-bit columns, half as many sixteen-bit columns, eight-times as many one-bit columns, or the like. However, an internal data bus may be significantly narrower than the array 200. For example, an array 200 may include thousands of sixteen-bit columns, but an array-side data bus 302 may be 64 bits wide, 96 bits wide, or the like. Thus, in certain embodiments, column circuits 204 may include latches, flip-flops or other components forming a page register, to store a page of data, and the array-side data bus 302 may transfer data into the page register for sequential windows or groups of columns.

In another embodiment, however, a memory device may read or write data at a smaller granularity, comparable to the width of an internal bus. For example, in one embodiment, data may be written to an array 200 in 64-bit bursts, 96 bit bursts, or the like, and may be transferred to the array 200 (or to column circuits 204) from an array-side data bus 302 of the same width. In either case, whether a data transfer from the array-side data bus 302 is written to the array 200 as one data unit (e.g., a burst), or whether multiple data transfers from the array-side data bus 302 are accumulated in a page register before writing a larger data unit (e.g., a page) to the array 200, a single data transfer via the array-side data bus 302 may be referred to as a transfer for a group or "window" of columns with the same width as the array-side data bus 302. The terms "window" or "access window" are used herein to refer to a group of columns selected for, or addressed in, a single data transfer via the array-side data bus 302. Thus, a memory device may read or write bits of data in parallel to, or from, a "window" or group of selected columns in a single data transfer, and may use multiple data transfers to read or write data to or from columns in different groups or windows. For example, the array-side data bus 302 may transfer a first data burst to a window including columns 0, 1, 2, and 3 of the array 200, then may transfer a second data burst to a subsequent window including columns 4, 5, 6, and 7 of the array 200. The term "read window" may also be used herein to refer to a window of columns for a data transfer in which the memory device reads data from the array 200. Similarly, the term "write window" may be used herein to refer to a window of columns for a data transfer in which the memory device writes data to the array.

The width of a bus, register, or window may be referred to in bits, or with reference to a column width. For example, with eight-bit columns, a 64-bit wide data bus may transfer data for a window of eight columns, and may be referred to as 8 columns wide. Conversely, with sixteen-bit columns, the same data bus may be referred to as 4 columns wide.

As described above, certain columns may be defective, bad, or non-functional. Defects may occur during manufacturing of memory chips or dies, or may arise over time as memory is used, and may affect the reliability of bit lines or columns. For example, a short between adjacent bit lines may result in bits not being correctly written to or read from cells via either bit line. If a defective or non-functional column is in a current window for reading or writing data, the column replacement component 150 may write data to a replacement column, or may read data from a replacement column in the same window.

The array-side data bus 302, in the depicted embodiment, is configured to transfer write data from the output register 304 to the array 200 in parallel. Thus, in certain embodiments, the width of the array-side data bus 302 may match the width of the output register 304. For example, for writing data to a window of six columns, the array-side data bus 302 and the output register 304 may both be six columns wide (e.g., for sixteen-bit columns, may both store or transfer 96 bits of data in parallel).

The output register 304 and the input register 316, in the depicted embodiment, both include divisions, where the output register 304 includes output divisions 310, and the input register 316 includes input divisions 314. In various embodiments, where a register includes a set of data storage components such as latches, flip-flops, or memory cells, a division of a register may refer to a subset of the data storage components. In further embodiments divisions of a register may be the same width as columns (e.g., may store eight bits for columns of eight bit lines, store sixteen bits for columns of sixteen bit lines, or the like), so that divisions of a register correspond to columns in the current access window.

For example, in the depicted embodiment, the array-side data bus 302 and the I/O-side data bus are 96 bits wide, for accessing windows of six sixteen-bit columns, so the output register 304 includes six sixteen-bit output divisions 310, and the input register 316 includes six sixteen-bit input divisions 314. In some embodiments with more or fewer columns in an access window, registers may similarly include more or fewer divisions, corresponding to the number of columns.

Additionally, in the depicted embodiment, the output register 304 includes a set of normal output divisions 306 (e.g., output divisions 310*a-d*) and a set of replacement output divisions 308 (e.g., output divisions 310*e-f*). As used herein the term "set" may refer to a collection of one or more things. Thus, for example, a set of replacement output divisions 308 may be one replacement output division 308, two replacement output divisions 308, or more. Additionally, the terms "normal" output divisions 306 ("NDs") and "replacement" output divisions 308 ("RDs") are used herein as names for two different groups 306, 308 of output divisions 310, which are treated differently by the column replacement circuit 312 when the column replacement circuit 312 transfers write data from the input register 316 to the output register 304 by selectively coupling input divisions 314 to output divisions 310, as described below. However the use of the names "normal" or "replacement" to refer to different groups of output divisions 310 is not intended to imply that the data storage components of the normal output divisions 306 do, or do not, differ from the data storage components of the replacement output divisions 308.

As described above with reference to FIG. 1, the column replacement component 150 may use some columns as "normal" columns, which are not targets for rerouted write data, and may use some columns as non-dedicated "replacement" columns, which may be targets for rerouted write data if there are bad columns in the access window, or which may store un-rerouted write data when not being used as targets for rerouted write data. In the depicted embodiment, the normal output divisions 306 correspond to normal columns in the access window, and the replacement output divisions 308 correspond to non-dedicated columns in the access window.

Additionally, output divisions 310 in the output register 304 may correspond to input divisions 314 in the input register 316. For example, in the depicted embodiment, six output divisions 310*a-f* and six input divisions 314*a-f* are numbered zero to six, so that input division 0 corresponds to output division 0, input division 1 corresponds to output division 1, and so on. Furthermore, input divisions 314*a-d* corresponding to normal output divisions 306 (output divisions 310*a-d*) may be referred to as "normal" input divisions, and input divisions 314*e-f* corresponding to replacement output divisions 308 (output divisions 310*e-f*) may be referred to as "replacement" input divisions.

In general, in various embodiments, the write apparatus 300 receives write data in the input register 316, selectively couples input divisions 314 to output divisions 310 to compensate for bad or non-functional columns, and outputs the (possibly rearranged) write data to from the output register 304 to the array 200.

The input register 316, in the depicted embodiment, is configured to receive write data for a memory array 200. For example, the input register 316 may receive write data from an I/O buffer via the I/O-side data bus 318. In various embodiments, an input register 316 includes a set of input divisions 314, as described above. For example, in the depicted embodiment, for transferring write data to a window of six columns at a time, the input register 316 includes six input divisions 314. Write data and read data, in various embodiments, may be any data that a die controller 206 writes to or reads from (respectively) and array 200, and may include user data sent from or to a storage client 116, metadata, redundant data for error correction, data that is being read from one area of the array 200 and written to another area of the array 200 in a garbage collection or grooming operation, or the like.

The output register 304, as described above, includes a set of normal output divisions 306 and a set of replacement output divisions 308. In the depicted embodiment, the output register 304 is configured to output the write data to the array 200. The write data output to the array 200 by the output register 304, in some embodiments, may be rearranged or in a different order compared to the write data in the input register 316, but may still be referred to as "the write data"

The output register 304 may output the write data to the array 200 by making the data available to the array 200 or to column circuits 204 via the array-side data bus 302. For example, in one embodiment, the output register 304 may output write data to the array 200 indirectly, by transferring the data over the array-side data bus 302 to page register latches in column circuits 204, with the column circuits 204 subsequently coupling page register latches to bit lines of the array 200. In another embodiment, column circuits 204 may include transistors or other switching components to couple lanes or conductors of the array-side data bus 302 to bit lines in a current access window, and the output register 304 may output write data to the array 200 directly, by making the data available on the array-side data bus 302. For example, in one embodiment, the output register 304 may output data by driving bit line voltages or currents via the array-side data bus 302. In another embodiment, however, the output register 304 may output data digitally via the array-side data bus 302, and column circuits 204 may drive analog bit line voltages or currents based on the digital information from the output register 304. In various other or further embodiments, an output register 304 may output data to an array 200 by making data available to the array 200 or to column circuits 204 in various other or further ways.

Additionally, in certain embodiments, the input register 316 and/or the output register 304 may be portions of, or integrated with other components, such as an input/output buffer, an asynchronous FIFO buffer, a synchronous FIFO buffer, or the like. For example, although FIG. 3A depicts the input register 316 coupled to an I/O-side data bus 318 for receiving write data from an I/O buffer, an input register 316 in another embodiment may include flip-flops, latches, or other data storage components within an I/O buffer, and may receive data when the data is written to the I/O buffer. Similarly, although FIG. 3A depicts the output register 304 coupled to an array-side data bus 302 for outputting the data to the array 200, an output register 304 in another embodiment may include flip-flops, latches, or other data storage components within a buffer that queues or stores data to be written to the array 200, and the output register 304 may output the data to the array 200 when the data is read from the buffer.

In certain embodiments, an input register 316 and an output register 304 may not be predetermined sets of circuits or components, but may be dynamically selected sets of circuits or components. For example, in one embodiment, an asynchronous FIFO (AFIFO) buffer may buffer data between external and internal clock domains; a synchronous FIFO (SFIFO) buffer, an AFIFO buffer, and/or another type of buffer may buffer data to absorb clock delay on the array-side data bus 302 (e.g., a feedback clock for the buffer may have a different phase than a clock on the other side of the buffer, due to delay from the array-side data bus 302); or the like. In such an embodiment, the input register 316 may be the subset of data-storing components in the AFIFO that store the next data to be written to the array 200, and the output register 304 may be the subset of data-storing components in the SFIFO, a second AFIFO, and/or another buffer that are available to receive the data.

The column replacement circuit 312, in the depicted embodiment, is configured to selectively couple input divisions 314 to output divisions 310. Divisions may be referred to as "coupled" if one division transfers data to or receives data from another division. For example, if an output division 310 is coupled to an input division 314, that output division 310 may receive data from the coupled input division 314. Thus, by coupling input divisions 314 to output divisions 310, the column replacement circuit 312 may transfer received write data from the input divisions 314 to the coupled output divisions 310, to be output to the array 200. In various embodiments, the column replacement circuit 312 may "selectively" couple input divisions 314 to output divisions 310 by selecting which input divisions 314 are coupled to which output divisions 310, and/or by coupling the selected pairs of divisions.

In FIG. 3A, arrows from input divisions 314 to output divisions 310 represent couplings that the column replacement circuit 312 may make or select, to selectively couple input divisions 314 to output divisions 310. Each input division 314, in the depicted embodiment, may be coupled to a corresponding output division 310 (with couplings between corresponding divisions represented by vertical arrows) or to at least one replacement output division 308 other than the corresponding output division 310 (with couplings between non-corresponding divisions represented by diagonal arrows).

Thus, viewing the possible couplings from the perspective of what output divisions 310 can receive data from, or be coupled to a given input division 314, a normal input division 314a-d can be selectively coupled by the column replacement circuit 312 to three possible output divisions 310: the corresponding normal output division 306 (e.g., one of output divisions 310a-d), and two replacement output divisions 308 (e.g., output divisions 310e-f). Similarly, a replacement input division 314e-f can be selectively coupled by the column replacement circuit 312 to two possible replacement output divisions 308: the output divisions 310e-f.

Equivalently, viewing the possible couplings from the perspective of what input divisions 314 can transfer data to, or be coupled to a given output division 310, a normal output division 306 (e.g., one of output divisions 310a-d) can only receive data from the corresponding input division. (e.g., one of input divisions 314a-d). However, a replacement output division 308 (e.g., one of output divisions 310e-f) can receive data from any of the normal or replacement input divisions 314*a-f*. In fact, the designation of output divisions 310 as normal output divisions 306 and as replacement output divisions 308 may be made on this basis: the term "normal output division" 306 is used herein to refer to an output division 310 that the column replacement circuit 312 may couple to a corresponding input division 314, but not to a non-corresponding input division 314, while the term "replacement output division" 306 is used herein to refer to an output division 310 that the column replacement circuit 312 may couple to a corresponding input division 314 or to a non-corresponding input division 314. For example, in the depicted embodiment, output division 310*a* is a "normal" output division because there is a possible coupling between output division 310*a* and its corresponding input division 314*a*, but not between the output division 310 and non-corresponding input divisions 314*b-f*. Similarly, in the depicted embodiment, output division 310*f* is a "replacement" output division because there is a possible coupling between output division 310*f* and its corresponding input division 314*f*, and at least one possible coupling between output division 310*f* and one of the non-corresponding input divisions 314*a-e*.

Thus, in various embodiments, the column replacement circuit 312 does not use a normal output divisions 306 to receive data from non-corresponding input divisions 314, but does use a replacement output division 308 to receive data from at least one non-dimensional input division 314 (e.g., if data is rearranged to compensate for bad or non-functional columns), or from the corresponding input division 314 (e.g., if the non-dedicated replacement division 308 is not used to compensate for bad or non-functional columns.

In various embodiments, the column replacement circuit 312 may include various selectable coupling components to selectively make or break coupling between input divisions 314 and output divisions 310. For example, in one embodiment, a possible coupling represented by an arrow in FIG. 3A may be embodied by an electronic component or components that can be switched on or off to couple or decouple an input division 314 and an output division 310, such as a transistor, a tri-state buffer, or the like. In certain embodiments, possible couplings represented by a set of arrows from different input divisions 314 into one output division 310 may be embodied by an electronic component such as a multiplexer, or a set of components such as tri-state buffers, to select which input line (from a plurality of input lines coupled to input divisions 314) is coupled to a single output line (coupled to a single output division 310). Conversely, in some embodiments, possible couplings represented by a set of arrows from one input division 314 to multiple output divisions 310 may be embodied by a demultiplexer, or a similar component or set of components to couple a single input to a selected output.

In certain embodiments, the column replacement circuit 312 may still be referred to as selectively coupling input divisions 314 to output divisions 310 if some of the couplings are fixed, permanent, or non-selectable. For example, in one embodiment, the normal output divisions 306 (e.g. output divisions 310*a-d*) may be permanently coupled to corresponding input divisions 314*a-d* by wires or other metal conductors without intervening switching component. For example, output division 310*a* can only receive data from input division 314*a* in the depicted embodiment. If the corresponding column in the access window is bad, data from input division 314*a* may still be transferred to output division 310*a* via a fixed coupling, and output to the bad column (where it possibly will not be reliably stored), but may also be transferred to a replacement output division 308 via a selectable or switchable coupling.

The arrows or possible couplings in FIG. 3A represent one embodiment of couplings that may be selectively made by a column replacement circuit 312. In another embodiment, a column replacement circuit 312 may include more possible couplings (e.g., if more replacement output divisions 308 are provided) or fewer possible couplings (e.g., if fewer replacement output divisions 308 are provided). Additionally, some couplings that are selectable in the depicted embodiment may be omitted from another embodiment. For example, in one embodiment, selectable couplings into individual replacement output divisions 308 may be from different subsets of the input divisions 314, so that couplings into the set of replacement output divisions 308 cover the full set of input divisions 314.

In one embodiment, the column replacement circuit 312 selectively couples input divisions 314 to output divisions 310 by coupling normal output divisions 306 for functional columns of the array 200 to corresponding input divisions 314, and by coupling replacement output divisions 308 for functional columns of the array 200 to input divisions 314 that the column replacement circuit 312 selects. The column replacement circuit 312 may selectively couple a replacement output division 308 to the corresponding input division 314 if the replacement output division 308 is not used to compensate for a non-functional column, or may selectively couple a replacement output division 308 to another input division 314 (e.g., an input division 314 other than the corresponding input division 314) if the replacement output division 308 is used to compensate for a non-functional column.

In various embodiments, a non-functional column may be a column that is known to be bad or defective, or that is otherwise designated for non-use. For example, a non-functional column may be a bad column that is removed from use due to a known or detected defect in the column, or may be a column that is not used for another reason. Conversely, a functional column may be a column that is not non-functional, and therefore may be a "good" column for which no defects have been detected, or a column that remains in use for any other reason. A functional column may, however, include an undetected defect, or may be a known bad column that is still in use (e.g., if a high error rate can be tolerated or compensated for in other ways.)

In certain embodiments, column information for an array 200 may include information about which columns are bad, which columns are good (including columns presumed good), which columns are non-functional or removed from use, and/or which columns are functional or in use. For example, bad column information may be a list of column addresses, locations, or other identifiers for bad columns. In one embodiment, column information may be generated by a manufacturer of a memory die based on testing of the die, and may be stored on the die. In some embodiments, column information may be generated or updated by the die controller 206 based on ongoing information about the columns, such as high error rates for columns that have become defective over time, information from a power-on self-test, or the like.

In various embodiments, a column replacement circuit 312 may selectively couple input divisions 314 to output divisions 310 based on column information. For example, in the depicted embodiment, the control circuit 320 is configured to output a match signal based on comparing selected column addresses to column information for the array 200. Selected column addresses may be addresses for columns in the current/selected access window. Column information may include addresses for good or functional columns, addresses for bad or non-functional columns or the like. The control circuit 320 may include registers for storing column addresses, a content-addressable memory for determining whether a column address is for a functional or non-functional column, or the like. Thus, the match signal may indicate which columns in the current access window are functional, or which columns in the current access window are non-functional.

In a further embodiment, the column replacement circuit 312 may couple input divisions 314 to output divisions 310 based on the match signal. For example, in one embodiment, bits of a match signal may be coupled (directly, or via additional logic gates) to select inputs of multiplexers, demultiplexers, tri-state buffers, or the like in the column replacement circuit 312, so that the column replacement circuit 312 selects couplings based on the match signal from the control circuit 320.

In various embodiments, the couplings selectively made by the column replacement circuit 312 may be couplings from input division 314 to output divisions 310 for functional columns of the array 200. As described above, divisions of the input register 316 and the output register 304 may correspond to columns in the current access window. Thus, whether a division is "for" a functional or a non-functional column of the array 200 is not a permanent attribute of the division, but depends on which columns are selected (or are in a current access window). In further embodiments, output divisions 310 for non-functional columns of the array 200 may also output data to the array 200, and the column circuits 204 may also read and write data to non-functional columns, but the columns may be unused in the sense that the data from the columns is unused or discarded. Thus, in various embodiments, the column replacement circuit 312 may couple an output division 310 for a non-functional column to an input division 314, or to no input division 314, in which case the data in the output division 310 for the non-functional column may be old data, or may be overwritten with zeros, ones, or the like.

However, as described above, the column replacement circuit 312 may couple normal output divisions 306 for functional columns to corresponding input divisions 314, and may select whether to couple replacement output divisions 308 for functional columns to corresponding input divisions 314 or to other (e.g., non-corresponding) input divisions 314. In certain embodiments, coupling normal output divisions 306 for functional columns to corresponding input divisions 314 may simplify routing circuitry between output divisions 310 and input divisions 314, compared to any-to-any connections between output divisions 310 and input divisions 314, or to more complicated routing that uses additional temporary divisions or registers to store redirected data. In further embodiments, selecting whether to couple replacement output divisions 308 to corresponding or non-corresponding input divisions 314 may use array capacity (e.g., for replacement columns) more efficiently than when dedicated replacement columns are used (e.g., if replacement output divisions 308 can only be coupled to non-corresponding input divisions 314 to reroute data away from bad columns).

In the depicted embodiment, the output register 304 includes four normal output divisions 306, and two replacement output divisions 308. Thus, the output register 304 may output write data for up to six columns (e.g., with different data in each output division 310 if none of the columns in the access window are bad or non-functional) and may reroute data to compensate for up to two bad or non-functional columns in the access window (e.g., with data for four columns going out to functional columns of the array 200). More generally, in various embodiments, a total number of replacement output divisions 308 may be based on a maximum number of non-functional columns for writing data to the array 200. For example, a manufacturer of the column replacement component 150 may provide a single replacement output division 308 to handle up to one bad column in the access window, may provide three replacement output divisions 308 to handle up to three bad columns in the access window, or the like. If the actual number of non-functional columns in the access window exceeds the selected maximum, the column replacement component 150 may use bad columns as if they were functional, resulting in increased data errors, or may shift the access window to a set of columns with fewer non-functional columns.

Also, in the depicted embodiment, the column replacement circuit 312 may move data directly from input divisions 314 to output divisions 310 without storing the data at an intermediate location. Certain column redundancy methods fetch write data for all the columns in the access window, but if one of the columns in the access window is bad, may store the data temporarily at an intermediate location. Providing latches, flip-flops, registers, or other storage components for an intermediate location may use die area for the storage components themselves, and for complicated routings to or from the intermediate storage components. By contrast, a column replacement circuit 312 that moves data directly from input divisions 314 to output divisions 310 may use die space more efficiently than a column replacement circuit 312 that includes components for intermediate data storage. Additionally, latency may be reduced by moving data directly between the input register 316 and the output register 304, compared to temporarily storing data for one or more columns at an intermediate location.

Figure 3B:
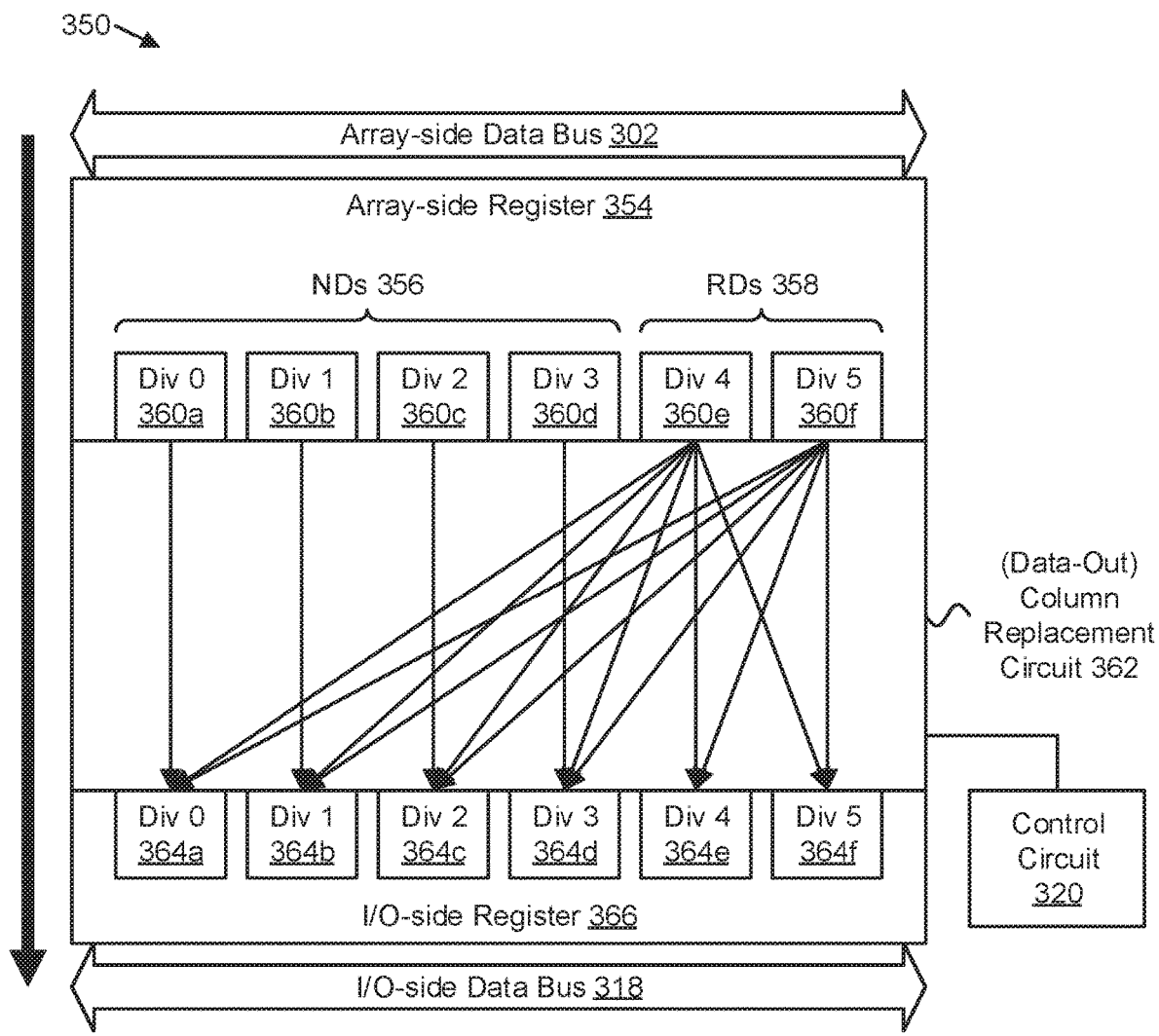
FIG. 3B is a schematic block diagram illustrating one embodiment of a read apparatus for a column replacement component.

FIG. 3B depicts one embodiment of a read apparatus 350 for a column replacement component 150. In various embodiments, a column replacement component 150, which may be substantially as described above with reference to FIGS. 1-3A, may include a read apparatus 350. In the depicted embodiment, the read apparatus 350 includes an array-side register 354, a column replacement circuit 362, and an I/O-side register 366, which are described below.

In various embodiments, the array-side register 354 is coupled to the memory array 200 (e.g., via the array-side data bus 302 described above for FIG. 3A) and receives read data from the memory array 200, and the I/O-side register 366 outputs the read data (e.g., to an I/O buffer via the I/O-side data bus 318 described above for FIG. 3A). The flow of read data from the array 200 to the array-side register 354, to the I/O-side register 366, and out to the I/O buffer is represented by a downward pointing arrow to the left of FIG. 3B.

In fact, the read apparatus 350 may be substantially similar to the write apparatus 300, with the data flow reversed. Thus, the register 354 at the top of the Figure is referred to as an "array-side" register rather than an output register 304, because it does not output data to the array 200; it receives data from the array 200. The array-side data bus 302 may transfer the read data from the array 200 to the array-side register 354 in parallel, and a width of the array-side data bus 302 may match matches a width of the array-side register 354, which may also be a width of a column access window for reading data from selected columns.

Similarly, the register 366 at the bottom of the figure is referred to as an "I/O-side register" register rather than an input register, because it does not receive data from the I/O buffer; it outputs the data. The I/O-side register 366 may output data on the I/O-side data bus 318 by making the data available on the bus, in ways similar to those described above for the output register 304 to output data on the array-side data bus 302.

Additionally, in the depicted embodiment, the array-side register 354 and the I/O-side register 366 both comprise divisions 360, 364 analogous to the divisions 310, 314 of FIG. 3A, which are divided into normal divisions 356 and replacement divisions 358. Also, as described above with reference to the input register 316 and the output register 304, the array-side register 354 and/or the I/O-side register 366 may be portions of, or integrated with other components, such as an input/output buffer, an asynchronous FIFO buffer, a synchronous FIFO buffer, or the like. For example, in one embodiment, an asynchronous FIFO (AFIFO) buffer may buffer data between external and internal clock domains; a synchronous FIFO (SFIFO) buffer, a second AFIFO buffer, and/or another type of buffer may buffer data to absorb clock delay on the array-side data bus 302; or the like. In such an embodiment, the array-side register 354 may be the subset of data-storing components in the SFIFO, a second AFIFO, and/or another buffer that store the next data to be transferred to the AFIFO for output, and the I/O-side register 366 may be the subset of data-storing components in the AFIFO that that are available to receive the data.

The column replacement circuit 362, in the depicted embodiment, transfers the read data from the array-side register 354 to the I/O-side register 366. In certain embodiments, the column replacement circuit 362 may be analogous to the column replacement circuit 312 of FIG. 3A, and may include similar conductors, tri-state buffers, multiplexers, demultiplexers, or the like, to selectively couple divisions 360 of the array-side register 354 to divisions of the I/O-side register 366. As in FIG. 3A, possible couplings are represented by arrows. Because data routing for reads, or data-out is the reverse of data routing for writes, or data-in, the arrows in FIG. 3B are identical to the arrows in FIG. 3A, with the direction reversed. The column replacement circuit 312 of FIG. 3A may move data toward the array 200 (e.g., to the output register 304), and the column replacement circuit 362 of FIG. 3B may move data away from the array 200 (e.g., to the array-side register 354).

In certain embodiments, the column replacement circuit 362 may rearrange the read data by coupling divisions 360 of the array-side register 354 to divisions 364 of the I/O-side register 366. Selecting which data goes to which divisions may be referred to herein as "rearranging the data" regardless of whether the data is arranged in its original order or in a different order. Similarly, a "rearrangement" of data may refer to a selected order for data, regardless of whether the selected order differs from a previous order. The column replacement circuit 312 of FIG. 3A may also be referred to as rearranging data between the input register 316 and the output register 304

In the depicted embodiment, the column replacement circuit 362 rearranges the read data based on column information for the array 200. In one embodiment, the control circuit 320 may output a match signal based on comparing selected column addresses to the column information, as described above for FIG. 3A, and the column replacement circuit 362 may rearrange the read data based on the match signal. For example, the match signal may be coupled to select inputs of tri-state buffers, multiplexer, or the like, for the column replacement circuit 362. Additionally, in certain embodiments, the column replacement circuit 362 rearranges the data by selectively coupling divisions 360 of the array-side register 354 to divisions 364 of the I/O-side register 366, without storing the data at an intermediate location. As described above, transferring or rearranging data without using an intermediate location for data storage may simplify routing, use die area efficiently, and reduce latency, when compared to using an intermediate location to facilitate rearranging data.

In the depicted embodiment, the column replacement circuit 362 rearranges read data based on column information by coupling normal divisions 356 of the array-side register 354 (e.g., divisions 360a-d) for functional columns of the array 200 to corresponding divisions 364a-d of the I/O-side register 366, and by selecting whether to couple replacement divisions 358 of the array-side register 354 (e.g., divisions 360e-f) for functional columns of the array 200 to corresponding divisions 364e-f of the I/O-side register 366, or to other (non-corresponding divisions 364 of the I/O-side register 366.

For example, if the access window is six columns wide and there are six functional columns in the access window, read data may be received from six columns, and may be transferred to six corresponding divisions 364 of the I/O-side register 366. However, if there is a non-functional column in the access window, read data may still be received for all six columns, but data from the non-functional column may not be transferred to an I/O-side division 364 for the non-functional column. Instead, the I/O-side division 364 for the non-functional column may receive data from a replacement division 360 for a functional column.

In certain embodiments, a column replacement component 150 may include a write apparatus 300 and a read apparatus 350 as described above. In another embodiment, a column replacement component 150 may include a single data rearrangement apparatus with a column replacement circuit that rearranges data by selectively coupling divisions between two registers, where the column replacement circuit and the registers are both configured for bi-directional data flow.

Figure 4:
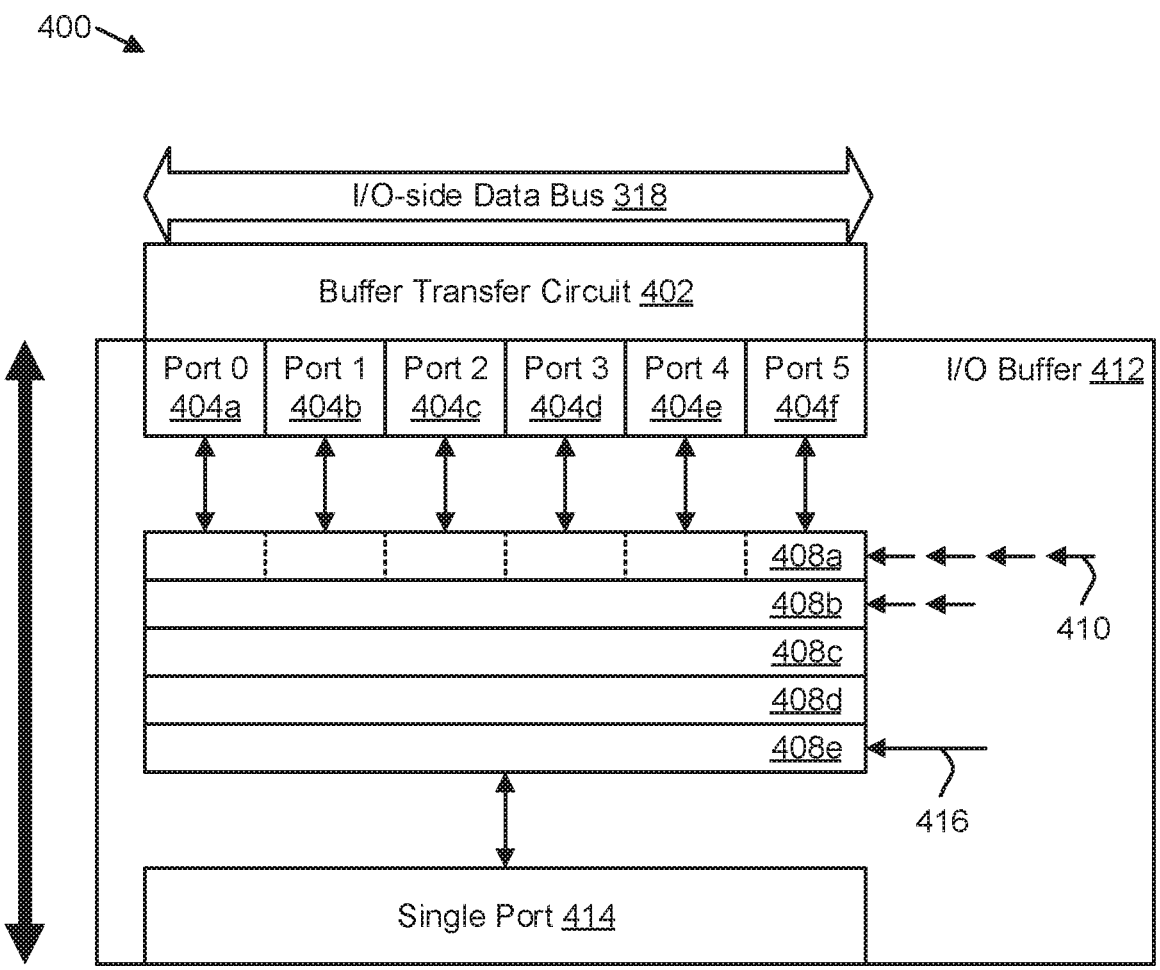
FIG. 4 is a schematic block diagram illustrating one embodiment of buffer components for a column replacement component.

FIG. 4 depicts one embodiment of buffer components 400 for a column replacement component 150. In various embodiments, a column replacement component 150, which may be substantially as described above with reference to FIGS. 1-3B, may include buffer components 400. In certain embodiments, buffer components 400 may communicate via the I/O-side data bus 318 to transfer write data to an input register 316 or to receive read data from an I/O-side register 366. In the depicted embodiment, the buffer components 400 include a buffer transfer circuit 402 and an I/O buffer 412, which are described below.

The buffer transfer circuit 402, in one embodiment, is configured to transfer write data from the I/O buffer 412 to the input register 316. In a further embodiment, the buffer transfer circuit 402 may also transfer read data from the I/O-side register 366 to the I/O buffer 412. The I/O buffer 412, as described above, may temporarily store write data received from a device controller 126 or read data to be sent to the device controller 126, and may include a bi-directional FIFO buffer, a pair of FIFO buffers for read and write data respectively, or the like. In certain embodiments, the I/O buffer 412 may be an asynchronous buffer (e.g., an asynchronous FIFO) that provides an interface between different clock domains. For example, in one embodiment, the I/O buffer 412 may interface with an external clock domain to send or receive data to or from a device controller 126, and may interface with an internal clock domain to send or receive data via the I/O-side data bus 318.

The buffer transfer circuit 402, in certain embodiments, may transfer a variable amount of write data to the input register 316, or a variable amount of read data from the I/O-side register 366, based on column information for the array 200. For example, the buffer transfer circuit 402 may transfer an amount of data that corresponds to the number of functional columns in the access window. In certain embodiments, transferring a variable amount of read or write data may allow a column replacement circuit 312, 362 to transfer data directly between registers without using intermediate data storage. For example, if a column replacement circuit 312 receives write data for six columns but only has five functional columns in the current window, it may temporarily store data for one column, to be written to a column in a subsequent write window. Similarly, if a column replacement circuit 362 for read data has five functional columns in the current window, but only transfers data for six columns at a time to the I/O buffer 412, it may temporarily store data for five columns, until reading data for a sixth column in a subsequent write window. By contrast, if a column replacement circuit 312, 362 has five functional columns in the access window, a buffer transfer circuit 402 capable of transferring data for six columns or fewer than six columns may transfer the data without the column replacement circuit 312, 362 storing data temporarily at another locations.

In one embodiment, the buffer transfer circuit 402 may transfer a variable amount of data to or from the I/O buffer 412 by literally moving that amount of data. In another embodiment, the buffer transfer circuit 402 may transfer a variable amount of data to or from the I/O buffer 412 by literally moving a larger, fixed amount of data, and adjusting pointers of the I/O buffer 412 to record a smaller data transfer. For example, in one embodiment, the buffer transfer circuit 402 may send or receive six columns of data to or from the I/O buffer 412, but may update pointers as if fewer than six columns of data were transferred. For read data, the sixth column of actually-transferred read data may be overwritten by a following transfer of read data. For write data, the sixth column of actually-transferred write data may be re-transferred to the write apparatus 300 in a following transfer of write data.

In certain embodiments, the buffer transfer circuit 402 may be configured to couple write data from the I/O buffer 412 to the input register 316 in parallel, to fill input divisions 314 in order. For example, the buffer transfer circuit 402 may fill at least the input divisions 314 corresponding to normal output divisions 306 (e.g., input divisions 314a-d), and may fill zero or more of the input divisions 314e-f corresponding to replacement output divisions 308, based on the bad column information. For example, in the depicted embodiment, if there are zero bad columns in the access window, the buffer transfer circuit 402 may fill all the input divisions 314. If there is one bad column in the access window, the buffer transfer circuit 402 may fill all but the last input division 314f (although, as described above, input division 314f may still receive data, but the data will not be written to the array 200, and will still exist in the I/O buffer 412. Similarly, if there are two bad columns in the access window, the buffer transfer circuit 402 may fill all but the last two input divisions 314e-f. For read data, the buffer transfer circuit 402 in the depicted embodiment may transfer data from 4, 5, or 6 of the I/O-side divisions 364 to the I/O buffer 412, depending on the number of bad columns.

The I/O buffer 412, in the depicted embodiment, is configured to store data in stages 408, with a stage width matching a width of the input register 316, which may also match a width of the I/O-side register 366. For example, in the depicted embodiment, the input register 316 and the I/O-side register 366 are both 96 bits wide, for six sixteen-bit columns, and a stage 408 of the I/O buffer 412 similarly stores 96 bits. In certain FIFO buffers data is moved into or out of the buffer in units of one stage. However, transferring a variable amount of data may involve data of less than an entire stage. Additionally, if one data transfer partially fills or partially empties one stage 408, a second data transfer may involve data in two adjacent stages 408.

Thus, in the depicted embodiment, the buffer includes a first end (at the bottom of FIG. 4), with a single port 414 for data transfers at the stage width, and a second end (at the top of FIG. 4) with a plurality of ports 404a-f for data transfers at a fraction of the stage width. For example, in the depicted embodiment, data transfers via the single port 414 may be in 96-bit units, matching the 96-bit stage width and the 96-bit (six-column) access window. In further embodiments, the fraction of the stage width may be based on the number of columns in an access window for reading or writing data. For example, in the depicted embodiment, with a six-column access window, the second end includes six ports 404 for transferring data in units of the column width, which is one sixth the stage width. In further embodiments, the buffer transfer circuit 402 may transfer variable amounts of write data to the input register 316 from the second end (e.g., ports 404), or may transfer variable amounts of read data from the I/O-side register 366 to the second end.

In some embodiments, the I/O buffer 412 includes a plurality of independent access pointers 410, corresponding to the plurality of ports 404, for data transfers at the second end. In the depicted embodiment, the I/O buffer 412 also includes an access pointer 416 for data transfers at the first end. An access pointer 410, 416, in various embodiments, may be circuitry that points to or activates data storage components in a buffer. For example, an access pointer 410, 416 may store a reference to a buffer stage 408, in one embodiment, or may output a signal that controls gates to determine which buffer stage 408 receives or outputs data. In some embodiments, an access pointer 410, 416 may be a ring counter, a Gray code counter or the like. In a FIFO buffer without a multiple-port end, access pointers 410, 416 may include a read pointer and a write pointer. In the depicted embodiment, access pointer 416 may be used as a read pointer or a write pointer for bi-directional data transfers at the single port 414, and access pointers 410 may be used and updated independently as read or write pointers for data transfers via the multiple ports 404.

For example, in one embodiment, each port 404 may transfer data for a different portion of a buffer stage 408. The port 404a may transfer data to or from a first fraction (e.g., sixth) of a stage 408, the port 404b may transfer data to or from a second fraction of a stage 408, and so on. The independent access pointers 410 may correspond to the ports 404, so that the port 404a transfers data to or from a stage 408 indicated by a first access pointer 410, the port 404b transfers data to or from a stage 408 indicated by a second access pointer 410, or the like. Thus, for example, if write data for four columns of the array 200 is transferred from four ports 404, four of the access pointers 410 may be incremented to point to a subsequent stage 408, and the other two access pointers 410 may remain pointing to the same stage 408 as previously.

In a certain embodiment, an I/O buffer 412 with a single read pointer and a single write pointer may be either empty or full when both pointers point to the same stage 408. (An additional bit in both pointers, or elsewhere, may be used to track whether the buffer is empty or full). In the depicted embodiment with independent access pointers 410 for data transfers at the second end, the I/O buffer 412 may output an empty/full signal, which may indicate an ambiguous empty/full state, an empty state, a full state or the like, in response of one or more of the independent access pointers 410 matching the access pointer 416 for data transfers at the first end. For example, in one embodiment, an I/O buffer 412 may assert or deassert independent empty/full indicators based on each of the independent access pointers 410 for data transfers at the second end, and may combine the independent empty/full indicators using an OR gate or similar logic. Thus, the I/O buffer 412 may output or assert the empty/full signal when one or more of the independent empty/full indicators are asserted, and may deassert or cease to output the empty/full signal when all of the independent empty/full indicators are de-asserted. Data transfers may be halted at an incoming end until a full buffer includes at least one empty stage 408, or may be halted at an outgoing end until an empty buffer includes at least one empty stage 408. Thus, in one embodiment, the device controller 126 and/or the buffer transfer circuit 402 may receive an empty/full signal from the I/O buffer 412 and may start or stop data transfers accordingly. In another embodiment, the buffer transfer circuit 402 receives the empty/full signal, and may start or stop data transfers accordingly, but the I/O buffer may omit circuitry for outputting the empty/full signal to the device controller 126.

Figure 5A:
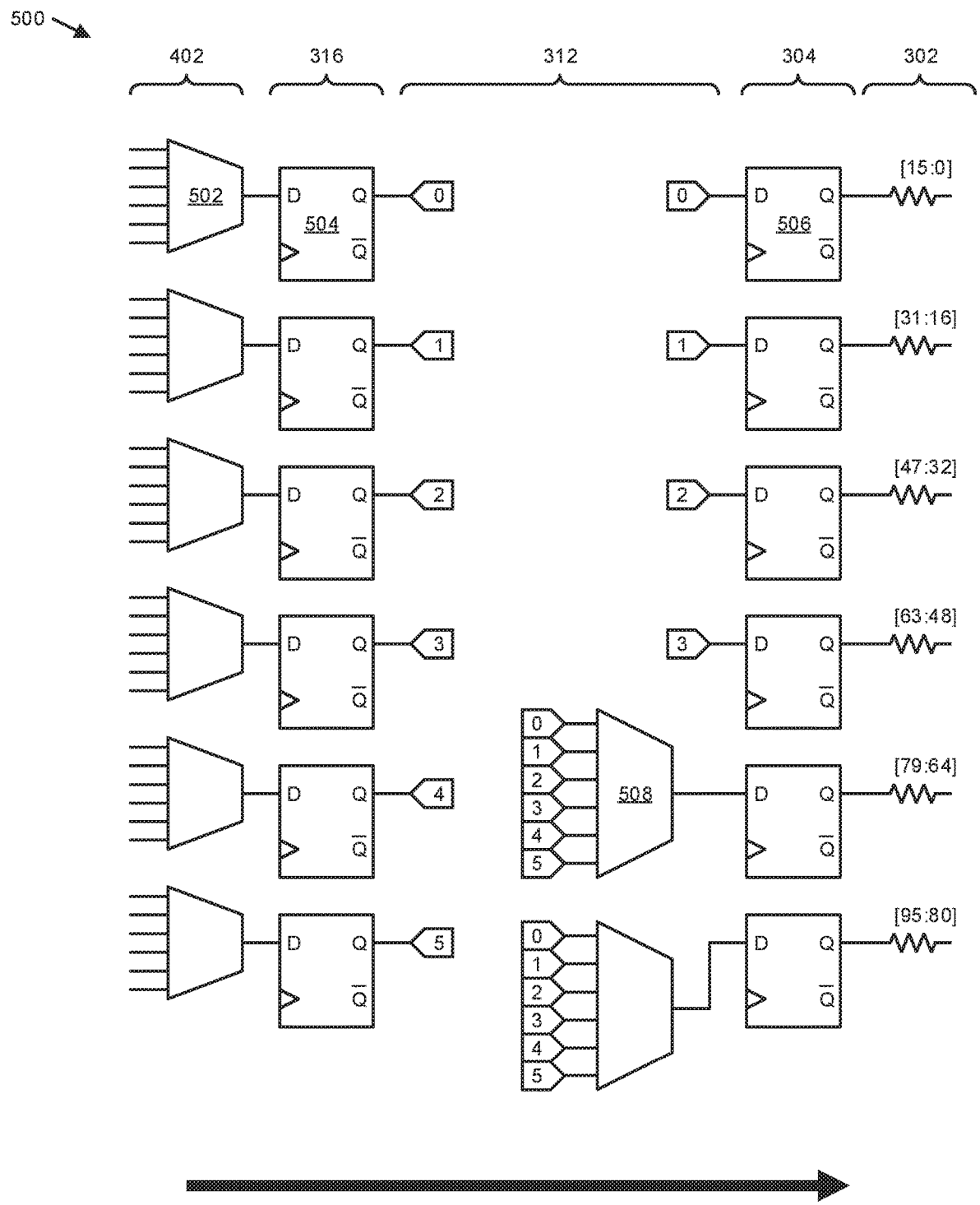
FIG. 5A is a schematic diagram illustrating one embodiment of circuitry of a column replacement component, for write data.
Figure 5B:
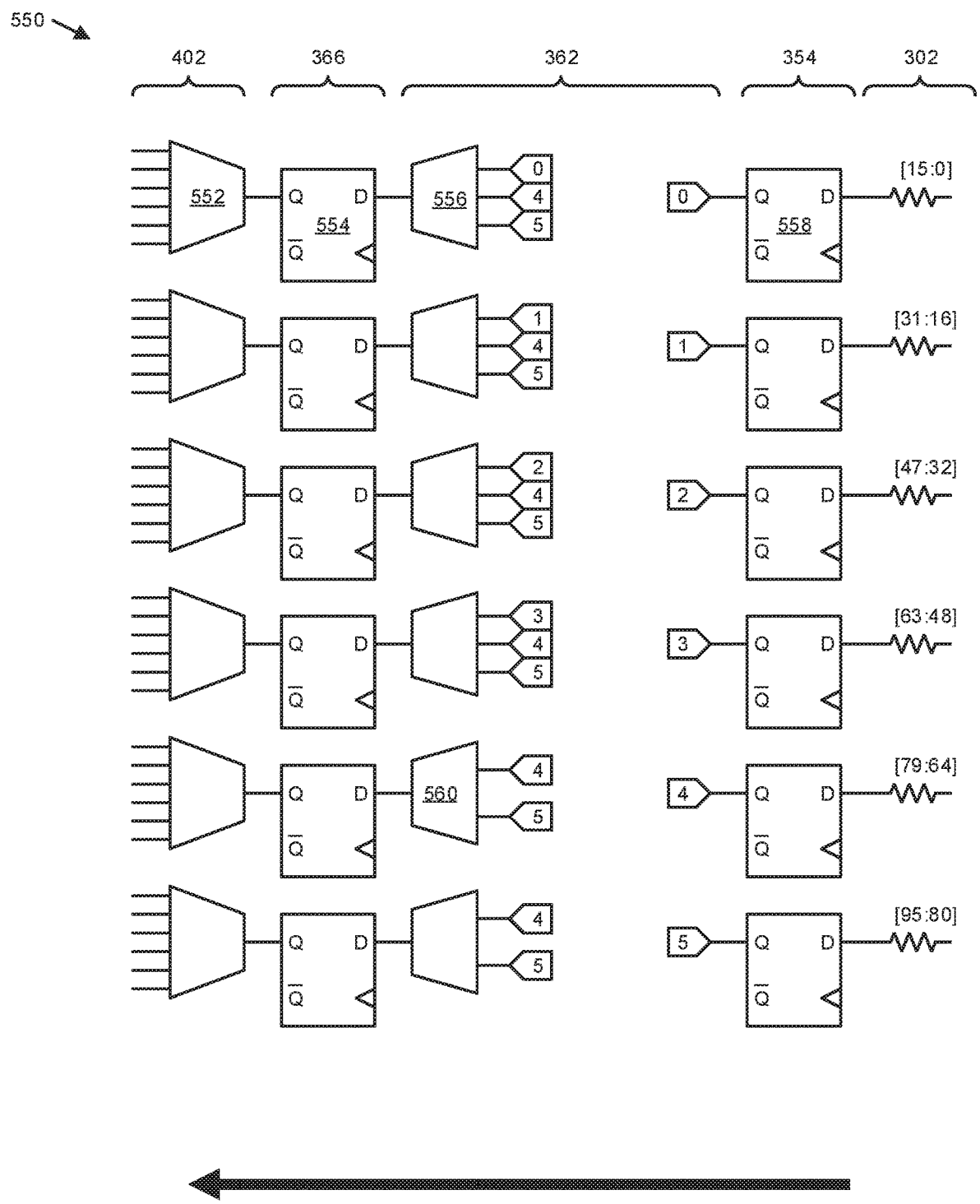
FIG. 5B is a schematic diagram illustrating one embodiment of circuitry of a column replacement component, for read data.

FIGS. 5A and 5B depict embodiments of circuitry 500, 550 of a column replacement component 150, for write data and read data respectively. In the depicted embodiment, the circuitry 500, 550 is used to embody or implement components described with reference to previous Figures, such as an input register 316, an output register 304, an I/O-side register 366, an array-side register 354, column replacement circuits 312, 362, and a buffer transfer circuit 402, which may be substantially as described above. In another embodiment, components such as an input register 316, an output register 304, an I/O-side register 366, an array-side register 354, column replacement circuits 312, 362, and a buffer transfer circuit 402 may be embodied or implemented by circuitry that is not shown in the depicted embodiment. For example, although FIG. 5A depicts a column replacement component 312 that includes six-to-one multiplexers 508, similar functionality may be implemented by chaining narrower multiplexers, using tri-state buffers, or the like.

The direction of data flow is indicated by arrows at the bottom of the Figures. In FIGS. 5A and 5B, a single depicted component that transfers or stores a single bit of data may correspond to or represent a set of identical or equivalent components for a column. For example, In FIG. 5A, a D-type flip-flop, storing a single byte of data, represents a division of sixteen D-type flip-flops, storing data for a column of sixteen bit lines. Resistors in FIGS. 5A and 5B represent the internal resistance/impedance of the array-side data bus 302, or of a path for writing data to or from memory cells.

In the embodiment depicted in FIG. 5A, the input register 316 comprises six input divisions 314 of D-type flip-flops 504, and the output register 304 comprises six output divisions 310 of D-type flip-flops 506. The buffer transfer circuit 402 comprises a plurality of multiplexers 502 configured to couple data from ports 404 of the I/O buffer 412 to input divisions 314. For example, in the depicted embodiment, six six-to-one multiplexers 502 can couple bits from any of the six ports 404 to any of the six flip-flops 504. Thus, if there are five good columns in the input window, the multiplexers 504 may transfer write data for the next five columns from five of the ports 404 (not necessarily starting at port 0), into the first five input divisions 314.

In FIGS. 5A and 5B, components may be coupled to circuit nodes, where couplings to a node may be shown by a label rather than by a wire, for convenience in depicting circuit routing. For example, in the depicted embodiment, six circuit nodes labelled 0-5 may be coupled to labels 0-5, respectively. In the embodiment depicted in FIG. 5A, a column replacement circuit 312 for write data uses multiplexers 508 to couple flip-flops 504 of the input register 316 to flip-flops 506 for replacement divisions of the output register 304, while flip-flops 506 for normal divisions of the output register 304 are coupled directly across to flip-flops 504 for corresponding divisions of the input register 316

For example, the first four output flip-flops 506 receive data directly from corresponding input flip-flops 504, while the last two output flip-flops 506 receive data, via multiplexers 508, from any of the input flip-flops 504. Although 6-to-1 multiplexers 508 are depicted, similar functionality may be implemented by chaining narrower multiplexers, using parallel tri-state buffers, or the like. Thus, the output flip-flops 506 for replacement divisions may receive data from any of the input flip-flops 504, and output flip-flops 506 for normal divisions receive data only from corresponding input flip-flops 504, as indicated by the arrows in FIG. 3A.

Similarly, in FIG. 5B, the buffer transfer circuit 402 comprises a plurality of demultiplexers 552 for transferring data from the I/O-side register 366 (including flip-flops 554 in six divisions). For example, if read data is obtained from five functional columns, the column replacement circuit 362 may arrange the data in the first five divisions of the I/O-side register 366, and the buffer transfer circuit 402 may transfer the data from those divisions to five of the ports 404, not necessarily starting at port 0. Flip-flops 558 of the array-side register 354 may receive data from the array-side data bus 302. The column replacement circuit 362, in the depicted embodiment, includes multiplexers 556, 560 for selectively coupling the array-side flip-flops 558 to the I/O-side flip-flops 554. Couplings to the multiplexers 556, 560 in FIG. 5B correspond to couplings indicated by arrows shown in FIG. 3A. As in FIG. 5A, multiplexers 556, 560 may be replaced by equivalent sets of tri-state buffers, and wider multiplexers 556 may be implemented by chaining narrower multiplexers.

Figure 6:
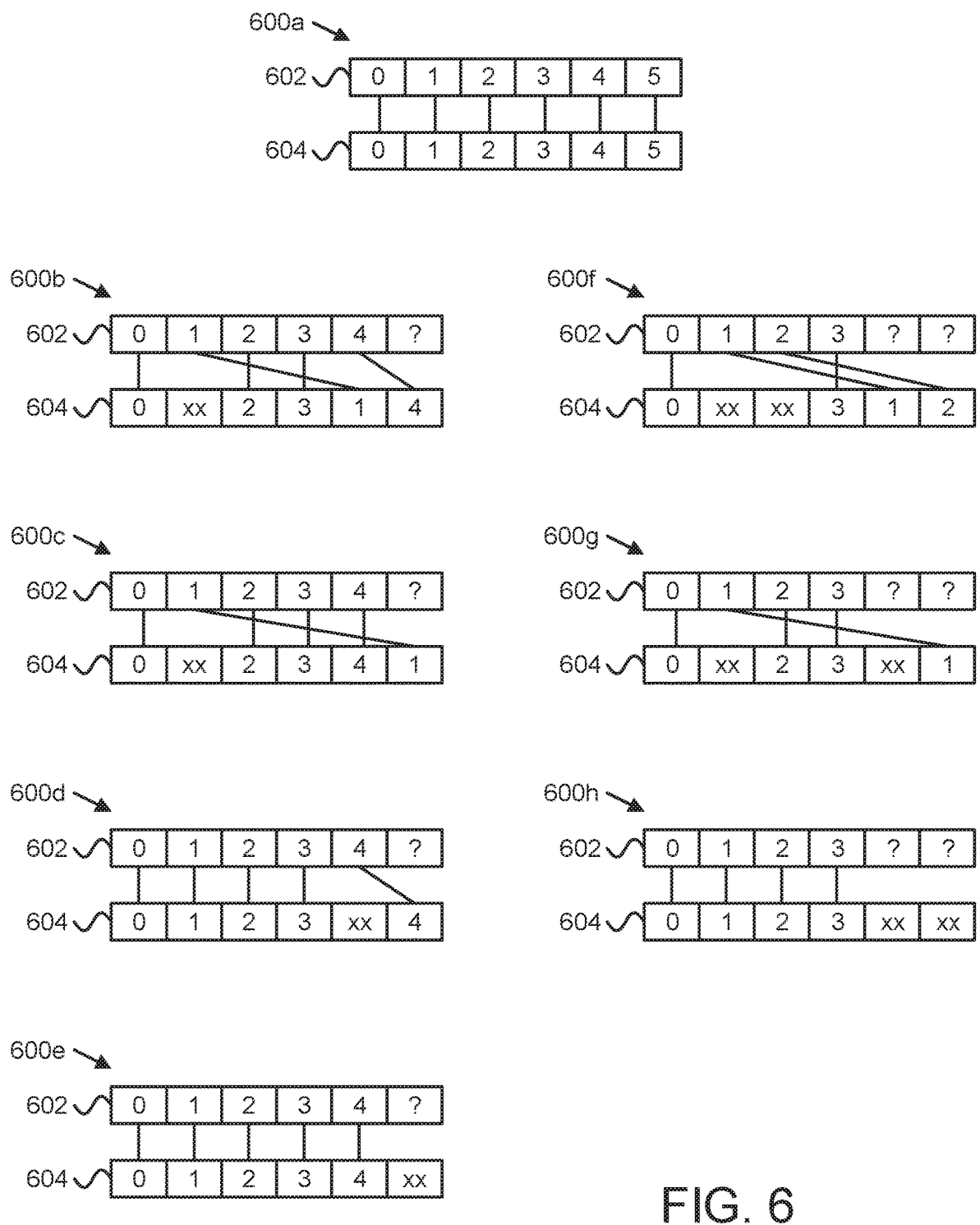
FIG. 6 is a chart illustrating selective couplings between divisions of registers, for various non-functional columns.

FIG. 6 is a chart illustrating selective couplings 600a-h between divisions of registers, which may be selected by a column replacement circuit 312, 362, based on column data. Because couplings or data rearrangements are equivalent when reading and writing data (e.g., so that the data is received in the same order as it was sent by the device controller 126), the register 602 at the top of each coupling 600 may represent an input register 316 for write data or an I/O-side register 366 for read data, as described above. Similarly, the register 604 at the bottom of each coupling 600 may represent an output register 304 for write data or an array-side register 354 for read data, as described above.

Coupling 600a depicts a coupling used when there are no non-functional columns in the access window. Thus, divisions 0-6 of the first register 602 are coupled directly to corresponding divisions 0-6 of the second register 604.

Couplings 600b-e depict couplings that may be selected when there is one non-functional column in the access window. The "xx" markings in the second register 604 indicate the location of the non-functional column. The buffer transfer circuit 402 may transfer data for five columns to or from divisions 0-4 of the first register 602. The "?" marking in the first register 602 indicates that data of the last division is unused.

In couplings 600b-c, the non-functioning column corresponds to a normal division of the second register 604, depicted as division 1. Thus, in coupling 600b, division 1 of the first register 602 is coupled to division 4 of the second register 604, which is a replacement division. The other replacement division of the second register 604 is not used to compensate for a non-functional column, but instead is coupled to a replacement division (division 4) of the first register 602. Otherwise, corresponding divisions are coupled together.

In coupling 600c, division 1 of the first register 602 is coupled to division 5 of the second register 604, which is a replacement division. Otherwise, corresponding divisions are coupled together. Where multiple replacement divisions are available for rerouting data, a match signal from the control circuit 320 may indicate which replacement division to use. For example, data may be rerouted to or from a first replacement division (e.g., in coupling 600b) if a match signal indicates an "odd" match or may be rerouted to or from a second replacement division (e.g., in coupling 600c) if a match signal indicates an "even" match.

In couplings 600d-e, the non-functioning column corresponds to a replacement division of the second register 604, depicted as division 4 in coupling 600d, and as division 5 in coupling 600e. In coupling 600d, division 4 of the first register 602 is coupled to division 5 of the second register 604, to compensate for the bad column, and corresponding divisions are otherwise coupled together. In coupling 600d, the bad column corresponds to division 5 of the second register 604, while division 5 of the first register 602 is unused, so corresponding divisions 0-4 may be coupled together Couplings 600f-h depict couplings that may be selected when there are two non-functional columns in the access window, again indicated by "xx" markings in the second register 604. The buffer transfer circuit 402 may transfer data for four columns to or from divisions 0-3 of the first register 602, with unused divisions again indicated by "?" markings in the first register 602.

In coupling 600f, both bad columns correspond to normal divisions (depicted as divisions 1 and 2) of the second register 604. Thus, divisions 1 and 2 of the first register 602 are coupled to replacement divisions 4 and 5 of the second register 604. Otherwise, corresponding divisions are coupled together.

In coupling 600g, the bad columns correspond to one normal division and one replacement division of the second register 604 (divisions 1 and 4, respectively). Thus, division 1 of the first register 602 is coupled to the remaining replacement division (division 5) for the second register 604. Otherwise, corresponding divisions are coupled together.

Lastly, in coupling 600h, both bad columns correspond to replacement divisions of the second register 604). Thus, divisions 4 and 5 of both registers 602, 604 are unused, and corresponding divisions 0-3 are coupled together.

Figure 7:
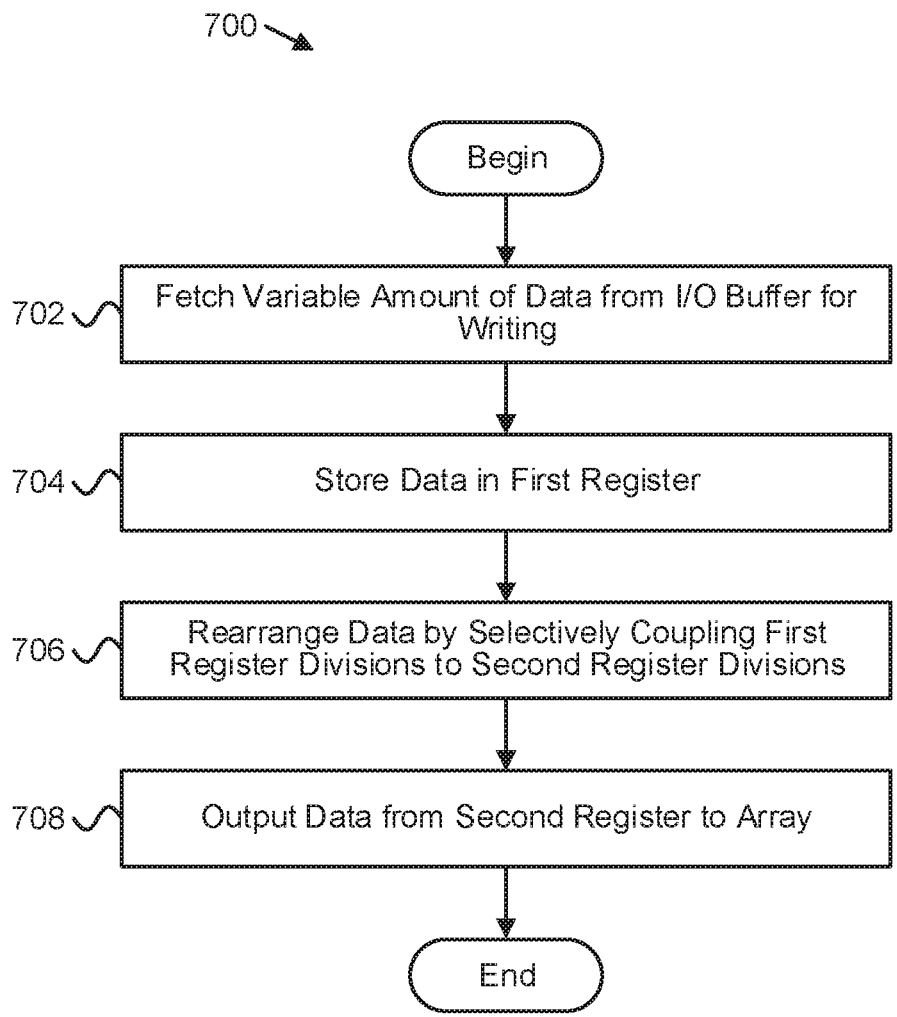
FIG. 7 is a schematic flow chart diagram illustrating one embodiment of a method for column replacement.

FIG. 7 is a schematic flow chart diagram illustrating one embodiment of a method 700 for column replacement. The method 700 begins, and includes fetching 702 a variable amount of data from an I/O buffer 412, for writing to a memory array 200. In one embodiment, the variable amount of data may be based on bad column information for the array 200. In a certain embodiment, a buffer transfer circuit 402 fetches 702 the variable amount of data. The method 700 includes storing 704 the data in a first register that includes a plurality of divisions. In one embodiment, the first register is an input register 316 that stores 704 the data in input divisions 314. The method 700 includes rearranging 706 the data by selectively coupling divisions of the first register to divisions of a second register based on the bad column information. In one embodiment, a column replacement circuit 312 rearranges 706 the data by coupling divisions 314 of the input register 316 (as the first register) to divisions 310 of the output register 304 (as the second register).

In a certain embodiment, the method 700 includes rearranging 706 the data such that normal divisions of the second register (e.g., the output register 304) for good columns of the array 200 receive data from corresponding normal divisions of the first register (e.g., the input register 316). In a further embodiment, the method 700 includes rearranging 706 the data such that replacement divisions of the second register (e.g., the output register 304) for good columns of the array 200 receive data from any remaining division of the first register (e.g., the input register 316), prioritizing normal divisions of the first register. The method 700 includes outputting 708 the data from the second register to the memory array 200, and the method 700 ends. In one embodiment, the die controller 206 outputs 708 the data from the output register 304 (as the second register) to the array 200 via the array-side data bus 302.

Figure 8:
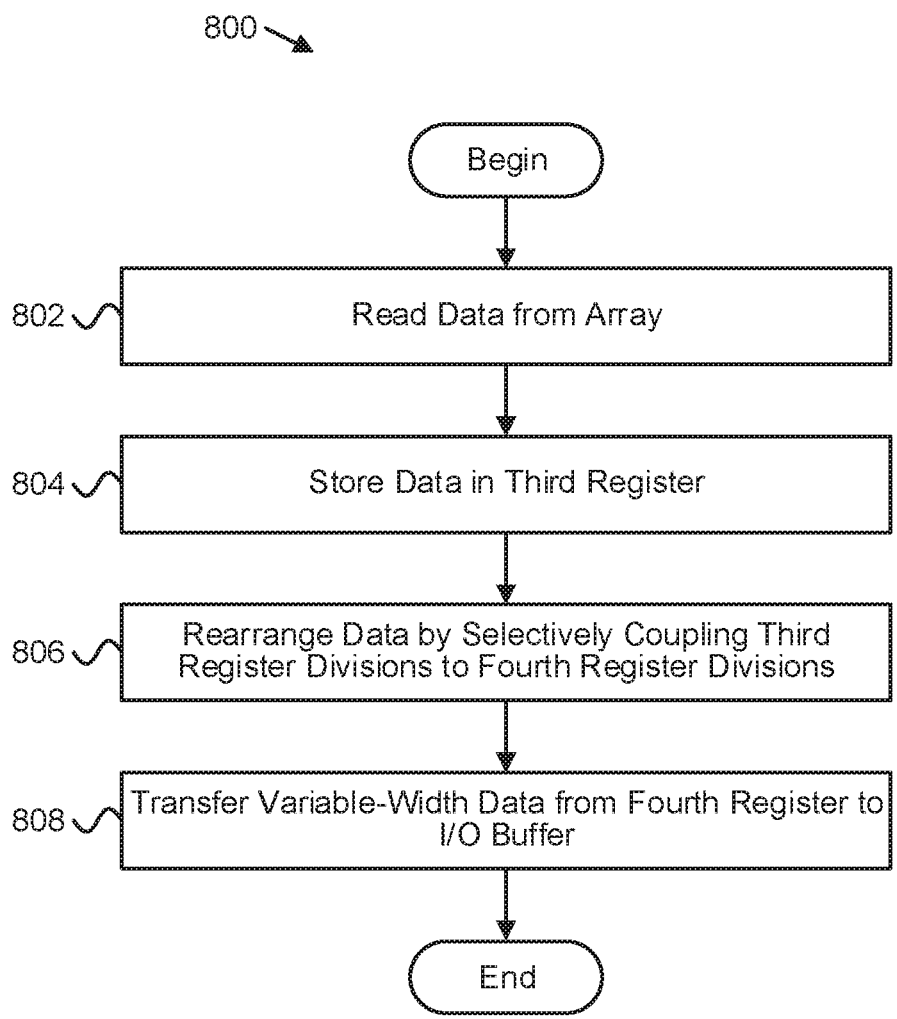
FIG. 8 is a schematic flow chart diagram illustrating another embodiment of a method for column replacement.

FIG. 8 is a schematic flow chart diagram illustrating another embodiment of a method 800 for column replacement. In certain embodiments, the method 800 may be used for reading data from the memory array 200, after the method 700 described above with reference to FIG. 7 has been used to write the data to the array 200. Thus, for a particular set of data, the method 800 may begin at a time subsequent to the method 700 ending. However, timing of the method 800 for one set of data may be independent of when the method 700 occurs for another set of data. For example, one data set may be read using the method 800 regardless of whether a separate data set has or has not been written using the method 700.

The method 800 begins, and includes reading 802 data from a memory array 200 and storing 804 the data in a third register. In certain embodiments, the data may be the data output 708 to the array 200 in the method 700, and the third register may be a register other than the first and second registers described above with regard to the method 700. In one embodiment, a die controller 206 may read 802 the data from the array 200 via the array-side data bus 302, and may store 804 the data in the array-side register 354 (as the third register). The method 800 includes rearranging 806 the data by selectively coupling divisions of the third register to divisions of a fourth register based on bad column information. In one embodiment, a column replacement circuit 362 rearranges 806 the data by coupling divisions 360 of the array-side register 354 (as the third register) to divisions 364 of the I/O-side register 366 (as the fourth register). In further embodiments, the method 800 includes rearranging 806 the data such that the order of the data in the fourth register (e.g., the I/O-side register 366) matches the order of the data in the first register (e.g., the order of the data in the input register 316 when the data was written using the method 700 of FIG. 7). The method 800 includes transferring 808 the data from the fourth register (e.g., the I/O-side register 366) to the I/O buffer 412 in a variable-width transfer based on the bad column information, and the method 800 ends. In one embodiment, the buffer transfer circuit 402 transfers 808 the data.

Figure 9:
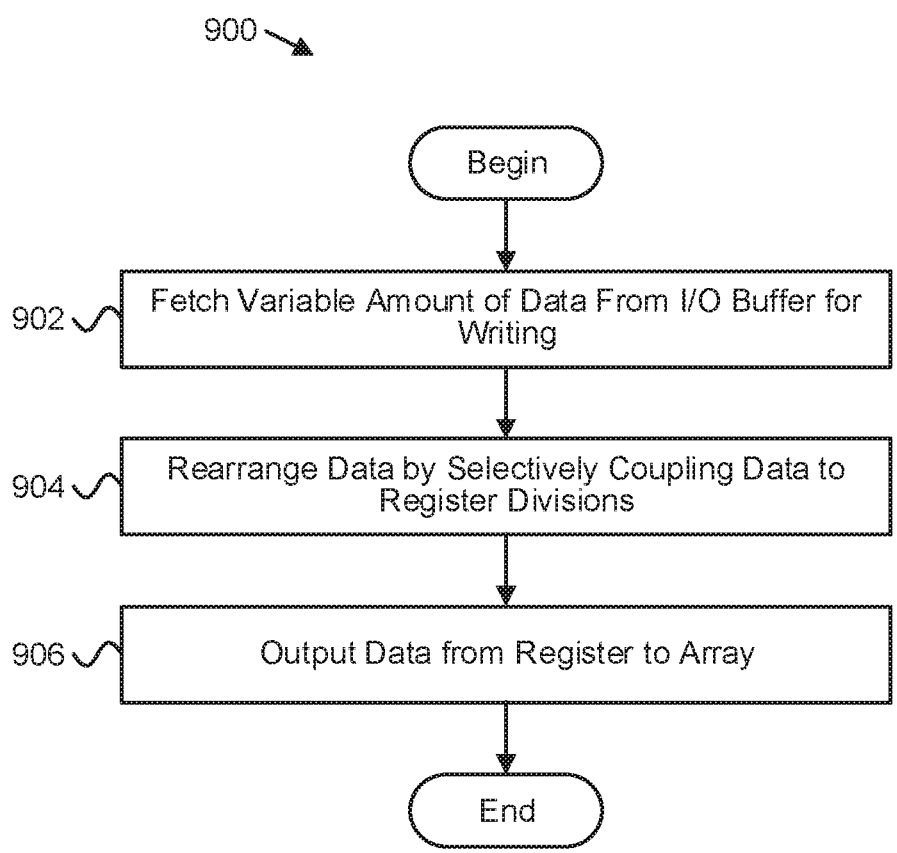
FIG. 9 is a is a schematic flow chart diagram illustrating another embodiment of a method for column replacement.

FIG. 9 is a schematic flow chart diagram illustrating another embodiment of a method 900 for column replacement. The method 900 begins, and includes fetching 902 a variable amount of data from an I/O buffer 412, for writing to a memory array 200. In one embodiment, the variable amount of data may be based on bad column information for the array 200. In a certain embodiment, a buffer transfer circuit 402 fetches 902 the variable amount of data. The method 900 includes rearranging 904 the data by selectively coupling the data to divisions of a register corresponding to good columns of the array 200. In one embodiment, a column replacement circuit 312 rearranges 904 the data by coupling the data to divisions 310 of the output register 304. The method 900 includes outputting 906 the data from the register to the memory array 200, and the method 900 ends. In one embodiment, the die controller 206 outputs 906 the data from the output register 304 to the array 200 via the array-side data bus 302.

Figure 10:
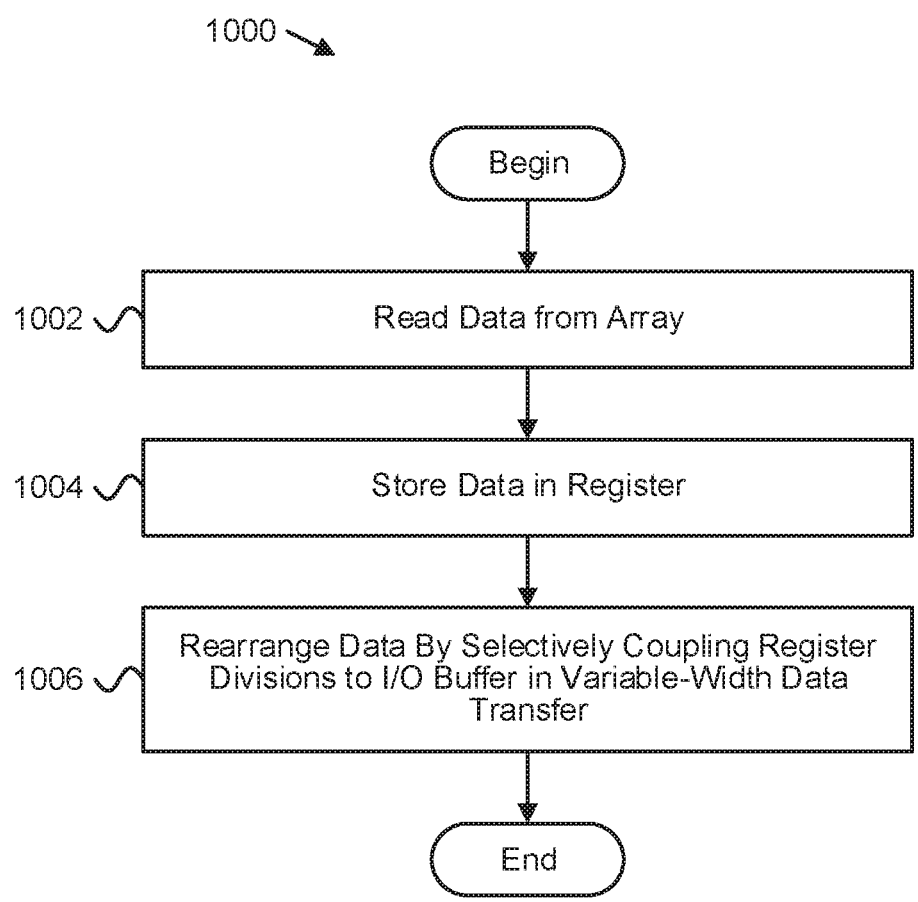
FIG. 10 is a schematic flow chart diagram illustrating another embodiment of a method for column replacement.

FIG. 10 is a schematic flow chart diagram illustrating another embodiment of a method 1000 for column replacement. In certain embodiments, the method 1000 may be used for reading data from the memory array 200, after the method 900 described above with reference to FIG. 9 has been used to write the data to the array 200. Thus, for a particular set of data, the method 1000 may begin at a time subsequent to the method 900 ending. However, timing of the method 1000 for one set of data may be independent of when the method 900 occurs for another set of data. For example, one data set may be read using the method 1000 regardless of whether a separate data set has or has not been written using the method 900.

The method 1000 begins, and includes reading 1002 data from a memory array 200 and storing 1004 the data in a register. In certain embodiments, the data may be the data output 906 to the array 200 in the method 900, and the register may be a register other than the register described above with regard to the method 900. In one embodiment, a die controller 206 may read 1002 the data from the array 200 via the array-side data bus 302, and may store 1004 the data in the array-side register 354. The method 1000 includes rearranging 1006 the data by selectively coupling divisions of the register to the input/output buffer 412 in a variable-width data transfer, based on bad column information, and the method 1000 ends. In one embodiment, a column replacement circuit 362 rearranges 1006 the data by coupling divisions 360 of the array-side register 354 to ports 404 of the I/O buffer 412. In further embodiments, rearranging 1006 the data read from the memory array reverses the rearrangement (in the method 900) of the data written to the memory array.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
a control circuit in communication with a memory array that includes a set of bad columns and a set of good columns;
an input register configured to receive write data from an input/output buffer to be written to the memory array, the input register comprising a set of input divisions;
an output register configured to output the write data to the memory array, the output register comprising a set of normal output divisions and a set of replacement output divisions; and
a column replacement circuit configured to selectively couple the set of normal output divisions to a first subset of the set of input divisions and couple the set of replacement output divisions to a second subset of the set of input divisions, the control circuit configured to cause the write data outputted from the output register to be stored using a first set of memory cells coupled to the set of good columns and a second set of memory cells coupled the set of bad columns.

2. The apparatus of claim 1, further comprising a buffer transfer circuit configured to transfer the write data from the input/output buffer to the input register, the buffer transfer circuit configured to transfer a variable amount of the write data to the input register based on column information for the memory array that specifies the set of bad columns, a first column of the set of good columns corresponds with a first set of bit lines within the memory array and a second column of the set of bad columns corresponds with a second set of bit lines within the memory array.

3. The apparatus of claim 2, wherein the buffer transfer circuit comprises a plurality of multiplexers configured to couple data from the input/output buffer to the input register, wherein the second column has at least one defective bit line.

4. The apparatus of claim 2, further comprising the input/output buffer, the input/output buffer configured to store data in stages with a stage width matching a width of the input register, the input/output buffer comprising a first end with a single port for data transfers at the stage width, and a second end with a plurality of ports for data transfers at a fraction of the stage width, wherein the buffer transfer circuit is configured to transfer the write data from the second end.

5. The apparatus of claim 4, wherein the input/output buffer further comprises a plurality of independent access pointers, corresponding to the plurality of ports, for data transfers at the second end.

6. The apparatus of claim 5 wherein the input/output buffer is configured to output an empty/full signal in response to one or more of the independent access pointers matching an access pointer for data transfers at the first end.

7. The apparatus of claim 1, further comprising a data bus configured to transfer the write data from the output register to the memory array in parallel, wherein a width of the data bus matches a width of the output register.

8. The apparatus of claim 1, wherein a total number of replacement output divisions is based on a maximum number of non-functional columns for writing data to the memory array.

9. The apparatus of claim 1, wherein the control circuit is configured to output a match signal based on comparing selected column addresses to column information for the memory array that specifies the set of bad columns, wherein the column replacement circuit is configured to couple input divisions to output divisions based on the match signal.

10. The apparatus of claim 1, wherein the column replacement circuit is configured to move data directly from input divisions to output divisions without storing the data at an intermediate location.

11. The apparatus of claim 1, wherein the output register comprises four normal output divisions and two replacement output divisions.

12. A system comprising:
a memory array that includes a set of bad columns and a set of good columns, the set of bad columns includes a first column with at least one defective bit line;
a control circuit in communication with the memory array;
an array-side register coupled to the memory array configured to receive read data from the memory array;
an input/output (I/O)-side register configured to output the read data to an input/output buffer, wherein the array-side register comprises a set of normal output divisions and a set of replacement output divisions and the I/O-side register comprises a set of input divisions; and
a column replacement circuit configured to transfer the read data from the array-side register to the I/O-side register and rearrange the read data based on column information for the memory array that specifies the set of bad columns, the column replacement circuit configured to couple the set of normal output divisions to a first subset of the set of input divisions and couple the set of replacement output divisions to a second subset of the set of input divisions, the control circuit configured to cause the read data to be read from a first set of memory cells coupled to the set of good columns and a second set of memory cells coupled the set of bad columns.

13. The system of claim 12 further comprising a buffer transfer circuit that transfers a variable amount of the read data from the I/O-side register to an input/output buffer based on the column information.

14. The system of claim 13, further comprising the input/output buffer, the input/output buffer storing data in stages with a stage width matching a width of the I/O-side register, the input/output buffer comprising a first end with a single port for data transfers at the stage width, and a second end with a plurality of ports for data transfers at a fraction of the stage width, wherein the buffer transfer circuit transfers the read data to the second end.

15. The system of claim 14, wherein the input/output buffer further comprises a plurality of independent access pointers, corresponding to the plurality of ports, for data transfers at the second end.

16. The system of claim 12, further comprising a data bus that transfers the read data from the memory array to the array-side register, wherein a width of the data bus matches a width of the array-side register.

17. The system of claim 12, wherein the control circuit configured to output a match signal based on comparing selected column addresses to the column information that specifies the set of bad columns, wherein the column replacement circuit configured to rearrange the read data based on the match signal.

18. The system of claim 12, wherein the column replacement circuit rearranges the data by selectively coupling divisions of the array-side register to divisions of the I/O-side register without storing the data at an intermediate location.

* * * * *